(12) United States Patent
Pan et al.

(10) Patent No.: US 12,271,319 B2
(45) Date of Patent: Apr. 8, 2025

(54) DATA STORED OR FREE SPACE BASED FIFO BUFFER

(71) Applicant: Intel Corporation, Santa Clara, CA (US)

(72) Inventors: Yanjie Pan, Shanghai (CN); Yong Jiang, Shanghai (CN); Yuanyuan Li, Shanghai (CN); Yong Zhang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 17/054,762

(22) PCT Filed: Sep. 27, 2018

(86) PCT No.: PCT/CN2018/107896
§ 371 (c)(1),
(2) Date: Nov. 11, 2020

(87) PCT Pub. No.: WO2020/061888
PCT Pub. Date: Apr. 2, 2020

(65) Prior Publication Data
US 2021/0248087 A1    Aug. 12, 2021

(51) Int. Cl.
*G06F 12/123* (2016.01)
*G06F 5/06* (2006.01)
(Continued)

(52) U.S. Cl.
CPC ............. *G06F 12/123* (2013.01); *G06F 5/06* (2013.01); *G06F 5/12* (2013.01); *G06F 12/0893* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 4,920,534 A | * | 4/1990 | Adelmann | H04L 49/9094 |
| | | | | 375/242 |
| 5,555,391 A | * | 9/1996 | De Subijana | G06F 12/0804 |
| | | | | 711/E12.04 |

(Continued)

FOREIGN PATENT DOCUMENTS

| | | | | |
|---|---|---|---|---|
| CA | 2717967 A1 | * | 4/2011 | G06F 3/0656 |
| CN | 102436421 A | | 5/2012 | |

(Continued)

OTHER PUBLICATIONS

'Design of Wireless Systems Utilizing Scratchpad Memories' by Panic et al., 2005. (Year: 2005).*

(Continued)

*Primary Examiner* — Steven G Snyder
(74) *Attorney, Agent, or Firm* — Hanley, Flight & Zimmerman, LLC

(57) ABSTRACT

Systems, methods, and computer-readable media are provided for variable precision first in, first out (FIFO) buffers (VPFB) that dynamically changes the amount of data to be stored in the VPFB based on a current amount of data stored in the VPFB and/or based on a current amount of available memory space of the VPFB. The currently unavailable memory space (or the current available memory space) is used to select the size of a next data block to be stored in the VPFB. Other embodiments are disclosed and/or claimed.

7 Claims, 20 Drawing Sheets

(51) Int. Cl.
  *G06F 5/12* (2006.01)
  *G06F 12/0893* (2016.01)

(56) References Cited

U.S. PATENT DOCUMENTS

| | | | | |
|---|---|---|---|---|
| 5,974,518 | A | 10/1999 | Nogradi | |
| 6,026,093 | A * | 2/2000 | Bellaton | H04L 47/62 370/429 |
| 6,134,629 | A * | 10/2000 | L'Ecuyer | G06F 5/12 711/219 |
| 6,151,299 | A * | 11/2000 | Lyon | H04L 47/54 370/229 |
| 6,389,073 | B1 * | 5/2002 | Kurobe | H04N 19/196 375/E7.181 |
| 6,687,255 | B1 * | 2/2004 | Holm | G06F 5/12 710/33 |
| 7,640,373 | B2 * | 12/2009 | Cudak | H04L 1/0026 710/33 |
| 7,724,756 | B2 * | 5/2010 | Chow | H04L 49/90 370/429 |
| 7,996,482 | B1 * | 8/2011 | Evans | H04L 67/2857 709/212 |
| 8,190,794 | B2 * | 5/2012 | Badi | G06F 5/065 710/308 |
| 8,634,431 | B1 | 1/2014 | Chiang et al. | |
| 9,112,818 | B1 * | 8/2015 | Arad | H04L 47/627 |
| 9,686,209 | B1 * | 6/2017 | Arad | H04L 49/252 |
| 2003/0037210 | A1 | 2/2003 | Haywood | |
| 2004/0160983 | A1 * | 8/2004 | Kuskin | H04L 69/04 370/470 |
| 2005/0041746 | A1 * | 2/2005 | Rosen | H04B 1/7163 375/242 |
| 2008/0005405 | A1 * | 1/2008 | Innis | G06F 5/12 710/56 |
| 2009/0147796 | A1 * | 6/2009 | Chow | H04L 47/6215 370/413 |
| 2010/0058087 | A1 * | 3/2010 | Borras | G06F 1/3275 713/322 |
| 2011/0093629 | A1 * | 4/2011 | Badi | G06F 9/30032 711/E12.001 |
| 2022/0345187 | A1 * | 10/2022 | Merlin | H04B 7/0658 |

FOREIGN PATENT DOCUMENTS

| | | | | |
|---|---|---|---|---|
| CN | 103391107 | A | | 11/2013 |
| CN | 106527984 | A | | 3/2017 |
| JP | 2004519123 | A * | | 6/2004 |
| KR | 19990022040 | A * | | 3/1999 |
| KR | 20140046052 | A * | | 4/2014 |
| WO | WO-0040030 | A1 * | 7/2000 | H04N 19/124 |
| WO | WO-2005089158 | A2 * | 9/2005 | H04L 12/66 |

OTHER PUBLICATIONS

'An Enhanced Dynamic Packet Buffer Management' by Vinod Rajan, 2005. (Year: 2005).*
'Snort—Chapter 6' copyright 2007, Elsevier Inc. (Year: 2007).*
'Design of Analog Baseband Circuits for Wireless Communication Receivers' Dissertation by Seoung Jae Yoo, 2004. (Year: 2004).*
Machine Translation of Japanese Patent Application JP 2001512643 A, 2001. (Year: 2001).*
International Search Report and Written Opinion mailed May 29, 2019 for International Patent Application No. PCT/CN2018/107896, 10 pages.
Rajeesh Kutty, "A Simple Baseband Processor for RF Transceivers", Analog Devices, Inc., Technical Article (2016), 6 pages, available at: https://www.analog.com/en/technical-articles/simple-baseband-processor-for-rf-transceivers.html#.
Neda Beheshti et al., "Packet Scheduling in Optical FIFO Buffers", 2007 High-Speed Networks Workshop, pp. 63-66. IEEE, (May 11, 2007).
Yashar Ganjali et al., "Update on Buffer Sizing in Internet Routers", ACM SIGCOMM Computer Communication Review, Oct. 2006, 4 pages, vol. 36, No. 5.
Justin P. Kinney et al., "A direct-to-drive neural data acquisition system", Frontiers in Neural Circuits, Sep. 1, 2015, 9 pages, vol. 9, art. 46.
Koushik Maharatna et al., "On the Implementation of a Low-Power IEEE 802.11a Compliant Viterbi Decoder", Proceedings of the IEEE International Conference on VLSI Design (VLSID'06) (Feb. 2006), 7 pages, available at: https://eprints.soton.ac.uk/263536/1/097_PID142349.pdf.
Hang Liu et al., "Error control schemes for networks: An overview", Mobile Networks and Applications, Sep. 1997, pp. 167-182, vol. 2, No. 2.
Nailah Ogeer, "Multiple Buffer Pools and Dynamic Resizing of Buffer Pools in PostgreSQL", Apr. 2004, 102 pages, Queen's University, Kingston. Ontario, Canada.
Mario P. Vestias et al., "A dynamic buffer resize technique for networks-on-chip on FPGA", 2011 VII Southern Conference on Programmable Logic (SPL), IEEE, Apr. 13, 2011, pp. 227-232.
David Waldo, "Fir Filter Implementation", DSP Lab with TI C6x DSP and C6713 DSK, Rice Univ., Ch. 5.2 (2013), 7 pages, available at: http://cnx.org/contents/17a0ea2a-1817-4d5b-99db-68ef47232c71@6.3/DSP_Lab_with_TI_C6x_DSP_and_C6.
"PMC676RCTX: Single or Dual Copper Gigabit Ethernet PMC with Deep FIFO", Datasheet, doc. 07/14 A-DS-1669A, Abaco Systems (2016), 2 pages.
"Hardware Reference Manual PMC676RC and PMC677RC Dual/Quad Port GbE", Pub. No. RX-URMH 139 Rev. E, Abaco Systems (2017), 24 pages.
"CableCARD Interface 2.0 Specification", Doc. Control No. OC-SP-CCIF2.0-127-150330, OpenCable™ Specifications, Mar. 30, 2015, 348 pages.
Neda Beheshti, et al., "Experimental study of router buffer sizing", Oct. 20, 2008, pp. 197-210, Proceedings of the 8th ACM SIGCOMM conference on Internet measurement.
Neda Beheshti, Ph.D. Thesis on Buffer Sizing in Routers (2009), 77 pages, available at: http://yuba.stanford.edu/~nbehesht/mythesis-Dec. 2009/.
Kamal Al-Bawani et al., "Comparison-based FIFO buffer management in QoS switches", Apr. 11, 2016, pp. 27-40, Latin 2016: Theoretical Informatics. Springer, Berlin, Heidelberg, available at: https://www.dcs.warwick.ac.uk/~englert/publications/qos_latin16.pdf.
Extended European Search Report mailed Mar. 29, 2022 for European Patent Application No. 18934951.7, 7 pages.

* cited by examiner

DATA STORED OR FREE SPACE BASED FIFO BUFFER

CROSS REFERENCE TO RELATED APPLICATIONS

The present application is a national phase entry under 35 U.S.C. § 371 of Int'l App. No. PCT/CN2018/107896, filed Sep. 27, 2018, entitled "DATA STORED OR FREE SPACE BASED FIFO BUFFER", which designated, among the various States, the United States of America, the contents of which is hereby incorporated by reference in its entirety.

FIELD

Embodiments discussed herein are related to computing, and in particular, to first in, first out (FIFO) memory, having particular application to wireless communication technologies.

BACKGROUND

First In, First Out (FIFO) is a queue processing technique that relates to the organization and manipulation of data according to time and prioritization, wherein data is processed on a first-come, first-served basis. FIFO buffers may be implemented as individual memory devices or as a reserved memory space used to cache received data that is not able to be immediately handled by an intended device or application. Some example uses for FIFO buffers include storing rows of received video (pixel) data, buffering data from a Universal Asynchronous Receiver-Transmitter (UART) device intended for a software application; buffering data received from or to be sent to an SDRAM interface, crossing a clock domains of different chips or devices (e.g., where data is generated at a first clock rate to be sent to a device that operates at a second clock rate that is faster or slower than the first clock rate); buffering digital data to be modulated for transmission over a wire or an air interface; and buffering a sampled and quantized analog signal to be demodulated into digital data.

In most cases, FIFO buffers do not fill up completely, although in some cases FIFO buffers can become full. For example, FIFO buffers used for wireless communications can fill up (or become "flooded") due to a sudden burst of data or when a complex system (e.g., a Software Defined Radio (SDR) and/or 5G network node) fails to handle dequeuing and/or data processing in a timely manner. Typically, when a FIFO buffer becomes full, incoming data is discarded or dropped. However, dropping data usually requires data retransmission, and thus, increases delivery delay and degrades quality of service.

One conventional solution for avoiding data drops includes allocating a large memory space to the FIFO buffer so that the FIFO buffer can meet the memory needs for potential worst case scenarios. In order to avoid discarding data, conventional systems tend to reserve a large amount of memory for their FIFO buffer. However, reserving large amounts of memory for FIFO buffers has several disadvantages. A first disadvantage is that large buffers result in inefficient memory utilization since the memory space reserved for FIFO buffers cannot be used for other applications. A second disadvantage is that larger buffers can increase the package size and/or production costs since larger memories may require more architectural complexity, power consumption, and board/package space. Considering these disadvantages, and since FIFO buffers do not usually become full, reserving such a large amount of memory for a FIFO buffer may be wasteful, especially for systems with limited memory space (e.g., FPGAs).

A second conventional solution for avoiding data drops includes compressing the data at a sending/transmitting device before sending the data to a receiving device. In this solution, since the size of the compressed data is smaller in size than uncompressed data, more data can be stored in the FIFO buffer before a data drop occurs. However, data compression is usually complicated and will likely introduce computing latency. Additionally, if any data becomes corrupt during the transmission process, the entire chunk or block of compressed data could become corrupt, which may result in additional data retransmissions. Moreover, in some cases, such as 5G systems, data may be very difficult or impossible to compress.

A third conventional solution for avoiding data drops includes adopting a flow control mechanism to stop a data transfer when a receive buffer is full (or almost full) and to resume the data transfer once the receive buffer becomes empty (or almost empty). However, flow control mechanisms can consume a significant amount of processing resources and/or processing time, and therefore, using this solution may result in additional network latency as a result of data transfer interruptions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
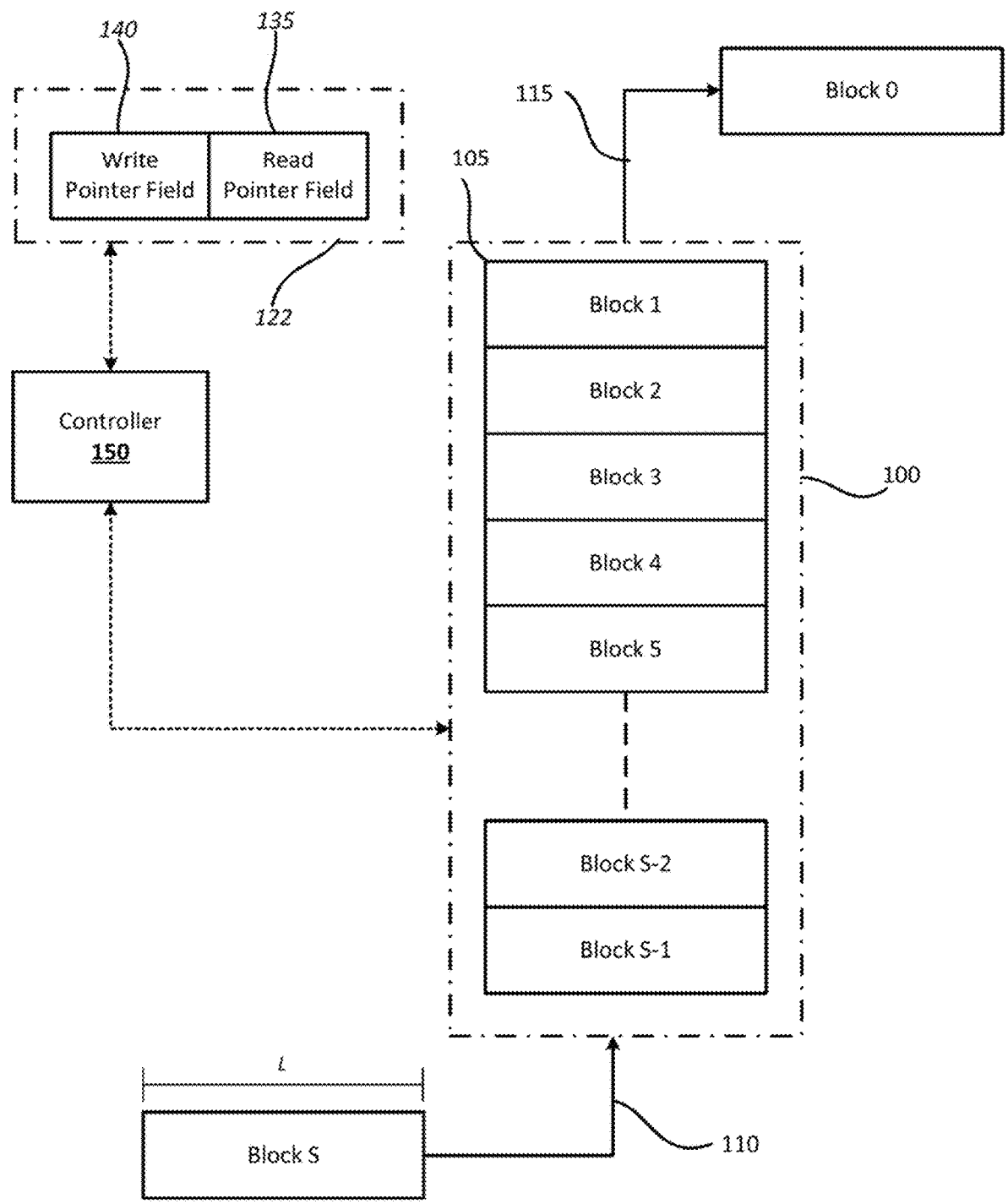
FIG. 1 illustrates an example data stored or free space based FIFO buffer of the present disclosure, according to various embodiments.

Disclosed embodiments provide a data stored or free space based, variable-precision FIFO buffer (VPFB) that dynamically changes the size of data to be stored in the VPFB based on a current amount of data stored in the VPFB and/or based on a current amount of available memory space of the VPFB. In particular, the currently unavailable memory space (or the current available memory space) is used to select the size of a next data block to be stored in the VPFB. The VPFB may be used in wireless communication systems, and for ease of understanding, the present disclosure describes various embodiments of the VPFB in the context of wireless communications. However, the various embodiments discussed herein is not so limited, and could be used in any other computing system or context that utilizes FIFO buffers or other similar buffers (e.g., circular buffers, etc.).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

I. Variable Precision FIFO Buffer Embodiments

FIG. 1 shows an example variable-precision FIFO buffer (VPFB) 100 according to various embodiments. The VPFB 100 is a database object, data structure, or electronic circuit (e.g., a hardware shift register, FPGA, etc.) configured to store a plurality of blocks 105 (not all of the blocks 105 in FIG. 1 are labeled for the sake of clarity). In the example of FIG. 1, the VPFB 100 currently stores data blocks 1 to S−1 105, block S is to be written into the VPFB 100 (or "enqueued") via input 110, and block 0 has been read out of the VPFB 100 (or "dequeued) via output 115. Like typical FIFO buffers, the VPFB 100 stores and processes blocks 105 on a first come, first served basis, wherein blocks 105 that are enqueued and dequeued in the order in which they are received and stored in the VPFB 100. In this example, block 0 was first received and stored in the VPFB 100 and is the first block 105 read out of the VPFB 100. Individual blocks 105 are enqueued and dequeued according to instructions or commands provided by the controller 150.

In some embodiments, the VPFB 100 may be implemented using shift registers, such as static random access memory (SRAM), flip-flops, latches, or any other suitable storage/memory circuitry. In these embodiments, the controller 150 may be a microprocessor, application processor, or some other suitable processing device. In some embodiments, the VPFB 100 may be implemented using a queue data structure, such as a fixed or dynamic length array, linked list, doubly linked list, double ended queue (deque), or the like. In these embodiments, the controller 150 may be control logic or program code that is executed by a suitable processing device.

In either of these embodiments, the controller 150 reads pointers from a VPFB index 122, which includes pointer fields 135 and 140 that indicate where to read and write data blocks 105. In this example, a value stored in the write pointer field 140 is a memory address of a location where a next block 105 to be stored (enqueued) in the VPFB 100 (e.g., Block S in FIG. 1) is to be stored, and a value stored in the read pointer field 135 is a memory address of a block 105 to be read out of (dequeued from) the VPFB 100 (e.g., Block 0 in FIG. 1) is located. This includes reading a write pointer from a pointer field to determine a memory location in which to write new block S and reading a read pointer to determine a memory location from which to read block 0.

When the controller 150 is notified of the arrival of a new block 105 to write into the VPFB 100 (e.g., Block S in FIG. 1), the controller 150 reads the value of the write pointer field 140, and controls storage of the new block 105 in the VPFB 100 at the memory location indicated by the write pointer field 140. After the new block 105 is stored in the VPFB 100 (or concurrently with the storage of the new block 105 in the VPFB 100), the controller 150 changes the value of the write pointer field 140 to indicate a next memory location to write a next data block 105 (e.g., by incrementing the value in the write pointer field 140). When the controller 150 is notified that a block 105 is to be read out of the VPFB 100 (e.g., Block 0 in FIG. 1), the controller 150 reads the value of the read pointer field 135, and controls output of the block 105 at the memory location indicated by the read pointer field 135 from the VPFB 100. After the block 105 is read out of the VPFB 100 (or concurrently with reading the block 105 from the VPFB 100), the controller 150 changes the value of the read pointer field 135 to indicate a next memory location from which to read a next data block 105 (e.g., by decrementing the value in the read pointer field 135). In various embodiments, controller 150 may read multiple blocks 105 (i.e., "data chunks") out of the VPFB 100 according to a read clock cycle, and may write multiple blocks 105 (i.e., "data chunks") into the VPFB 100 according to a write clock cycle that may be different than the read clock cycle.

Each of the blocks 105 may have any suitable size or length L, which may be application dependent. The length L of each block 105 represents the amount of data in the block. For example, L may represent a number of bits, a number of bytes, one or more decimal or hexadecimal digits, or the like. In typical FIFO buffer implementations, the length L of each block 105 is uniform and fixed. In other words, each of the blocks stored in conventional FIFO buffers have the same size and length. Additionally, conventional FIFO buffers have a fixed size or depth, which means that new blocks that arrive for storage in a conventional FIFO buffer are dropped if the FIFO buffer is full or almost full.

According to various embodiments, the blocks 105 have a variable length L meaning that individual blocks 105 may have different sizes than other blocks 105 in the VPFB 100. In various embodiments, the controller 150 dynamically changes the size of each block 105 (i.e., the amount of data) to be stored in the VPFB 100 based on a current amount of data stored (or occupied memory space) in the VPFB 100 and/or based on a current amount of available memory space in the VPFB 100. In particular, the currently unavailable memory space (or the current available memory space) of the VPFB 100 is used to select the size of a next data block 105 to be stored in the VPFB 100. In order to change the size of a block 105 (or change the size of the data) to be stored in the VPFB 100, the controller 150 is configured to select a size of the block 105 (e.g., a number of bits of the block 105) based on the currently unavailable memory space (or the current available memory space) of the VPFB 100. In these embodiments, the size of the block 105 (or the number of bits) selected for storage in the VPFB 100 decreases as the amount of available memory space in the VPFB 100 decreases (or as the amount of currently occupied space in the VPFB 100 increases). Additionally, the size of the block 105 (or the number of bits of data) selected for storage in the VPFB 100 increases as the amount of available memory space in the VPFB 100 increases (or as the amount of currently occupied space in the VPFB 100 decreases). In some embodiments, the unselected data (or bits) may be discarded prior to storing the selected data (or bits) in the VPFB 1). The number of bits that are selected for storage in the VPFB 100, and the particular bits that are selected for storage in the VPFB 100, is application dependent and varies from embodiment to embodiment. The aspects of these embodiments are discussed in more detail infra.

In a first example use case, the VPFB 100 may be a circular buffer used to buffer keyboard inputs or touchscreen inputs. In this example, each of the blocks 105 may represent an individual American Standard Code for Information Interchange (ASCII) character in binary, decimal, hexadecimal, octal, or some other suitable format. Conventional circular buffers have a fixed size (or fixed number of memory locations) and new incoming data blocks overwrite data stored in previously written memory locations. In conventional keyboard circular buffers, when the write pointer is about to reach the read pointer, the buffer will stop recording keystrokes (or gestures) and issue an error because the controller is not able to respond to the new incoming data. In embodiments, the controller 150 is configured to select the number of bits used to represent each ASCII character according to a current available memory space (or currently unavailable memory space) of the VPFB 100. Where an ASCII character is stored with fewer bits than used to represent the character, a suitable auto-correct application could be used to predict the proper character based on the preceding characters or the like.

In a second example user case, the VPFB 100 may be implemented in a receiver device and used to buffer samples of an analog signal. The analog signal may be a wireless radiofrequency (RF) signal that arrives at a wireless receiver via an over-the-air (OTA) channel, an RF or optical signal that arrives at a network interface controller (NIC) over a wired connection, an electric audio signal that arrives at a receiver via a wireless or wired interface to be converted into sound. In this example, each of the blocks 105 may represent a sample of the analog signal, and 4 bits (0.5 bytes), 8 bits (1 byte), or 16 bits (2 bytes). When the VPFB 100 is used in analog signal applications, the controller 150 is configured to select a quantization precision of the sampled analog signal according to a current available memory size (currently occupied memory space) of the VPFB 100. When the analog signal arrives at the receiver, the analog signal is sampled and quantized. In some embodiments, the controller 150 may implement or operate a quantization algorithm to select the quantization precision, or the controller 150 may instruct a quantizer (e.g., an analog-to-digital converter of the receiver) to select the quantization precision. In other embodiments, a separate quantizer or quantization function is configured to generate a quantized value (e.g., a first number of bits) based on the sampled analog signal, and the controller 150 is configured to change the quantization precision when storing the quantized value in the VPFB 100. In these embodiments, the controller 150 is configured to change the quantization precision by selecting bits from among the quantized value (e.g., a second number of bits) to be stored in the VPFB 100. In some embodiments, the selected bits may be chosen at random, while in other embodiments, different predefined portions of the quantized value may be selected depending on the size or amount of available space (or unavailable space) in the VPFB 100. The term "sampling" refers to a process of converting an analog signal into a number of data points at different times, and the term "quantization" refers to the number of data points used in a given sample. The term "precision" in "quantization precision" refers to the quantization after sampling. In other words, the quantization precision is the number of bits used to represent the quantized sample.

In embodiments, the controller 150 selects a quantization precision according to a current available (or unavailable) memory of the VPFB 100. As examples, the quantization precision (number of bits) N may be 4, 8, or 16 bits. If there is not much room left in the VPFB, the controller 150 will decrease the quantization precision and only store a few higher bits of the quantization data. When new quantization data is obtained and the currently occupied memory is less than a first threshold (e.g., 50% of the memory size limit or maximum size of the VPFB), then the N number of bits may be used to represent the sample and the entire N number of bits is stored in the VPFB. When the currently occupied memory is greater than or equal to the first threshold and less than a second threshold (e.g., 75% of the memory size limit or maximum size of the VPFB), then the N/2 number of bits may be used to represent the sample and the higher (greater) N/2 number of bits is stored in the VPFB. When the currently occupied memory is greater than or equal to the second threshold and not completely filled, then the N/4 number of bits may be used to represent the sample and the higher (greater) N/4 number of bits is stored in the VPFB. If the VPFB is full when the new quantization data arrives at the receiver, then the new quantization data is dropped or discarded. In this way, the VPFB 100 will not drop data in most data flooding situations while using less memory space than conventional FIFO buffer implementations. Compared to conventional dropping solutions, and given typical FIFO buffer size/space limits, the embodiments herein significantly reduce data drop ratios, and therefore, reduce delivery delay and improve transmission efficiency. Furthermore, the embodiments herein are able to achieve reduced drop ratios while using a much smaller memory size/space allocation when compared to conventional FIFO buffer sizes/spaces. In particular, simulation results show that only 28% of a conventional FIFO buffer size is needed when implementing the embodiments discussed herein.

Generally, a lower quantization precision will decrease signal-to-noise ratio (SNR) and increase the bit error rate (BER). However, the impact of the SNR and/or BER is considered trivial when a low quantization precision is well selected. An original SNR of a received analog signal (denoted as SNR) is based on a signal power (denoted a $P_S$) and noise power introduced by the channel (denoted as No), as is shown by equation 1.

$$SNR_0 = \frac{P_S}{N_0} \quad \text{[equation 1]}$$

If the quantization precision is N bits (where N bits is used to represent a sample), then some quantization error will be introduced, which can be regarded as noise (with power $N_q$). This means that the quantization SNR ($SNR_q$) can be expressed as shown by equation 2.

$$SNR_q = \frac{P_S + N_0}{N_q} \quad \text{[equation 2]}$$

The SNR after quantization can be expressed by equation 3.

$$SNR = \frac{P_S}{N_0 + N_q} = \frac{SNR_0 * SNR_q}{1 + SNR_0 + SNR_q} \quad \text{[equation 3]}$$

Equation 3 yields equation 4.

$$SNR(dB) = 10\log_{10}\left(\frac{SNR_0 * SNR_q}{1 + SNR_0 + SNR_q}\right) = SNR_q(dB) - \Delta(dB) \quad \text{[equation 4]}$$

In equation 4, $\Delta$ (dB) is the difference between the original SNR ($SNR_0$) and the SNR after quantization (SNR). For a system using digital representation, there is a generalized quantization SNR, as shown by equation 5.

$$SNR_q(dB) = 6.02N + 1.76(dB) \quad \text{[equation 5]}$$

Combining equations 4 and 5, yields equation 6.

$$\Delta(dB) = \\ 10\log_{10}\left(1 + SNR_0 + 10\frac{6.02N + 1.76}{10}\right) - 6.02N - 1.76(dB) \quad \text{[equation 6]}$$

Figure 2:
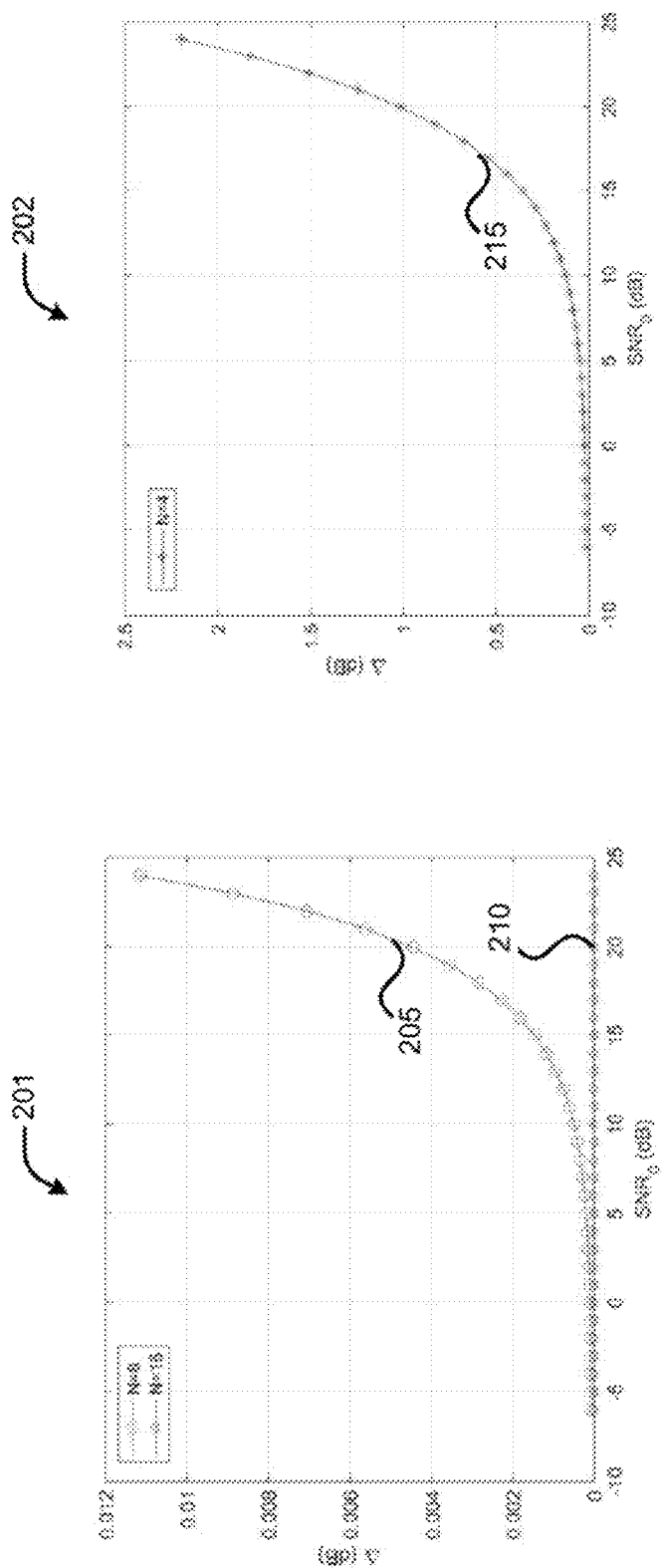
FIG. 2 illustrates a graph of signal-to-noise ratio (SNR) difference versus original SNR when a quantization precision is 16 bits and 8 bits, and a graph of SNR difference versus original SNR when a quantization precision is 4 bits.

FIG. 2 shows graphs 201 and 202. Graph 201 shows the SNR difference ($\Delta$ (dB)) versus original SNR ($SNR_0$) when N is 8 bits (line 205 in FIG. 2) and when N is 16 bits (line 210 in FIG. 2). As shown by graph 201, when the quantization precision is 16 bits, there is almost no impact on SNR. When the quantization precision is decreased to 8 bits, there is only about 0.01 dB SNR degradation, which means the impact is still very small. Graph 201 shows an SNR difference ($\Delta$ (dB)) versus original SNR ($SNR_0$) when N is 4 bits (line 215 in FIG. 2). Graph 202 shows that, for N=4 bits, the SNR increases as the quantization $\Delta$ (dB) increases.

Figure 3:
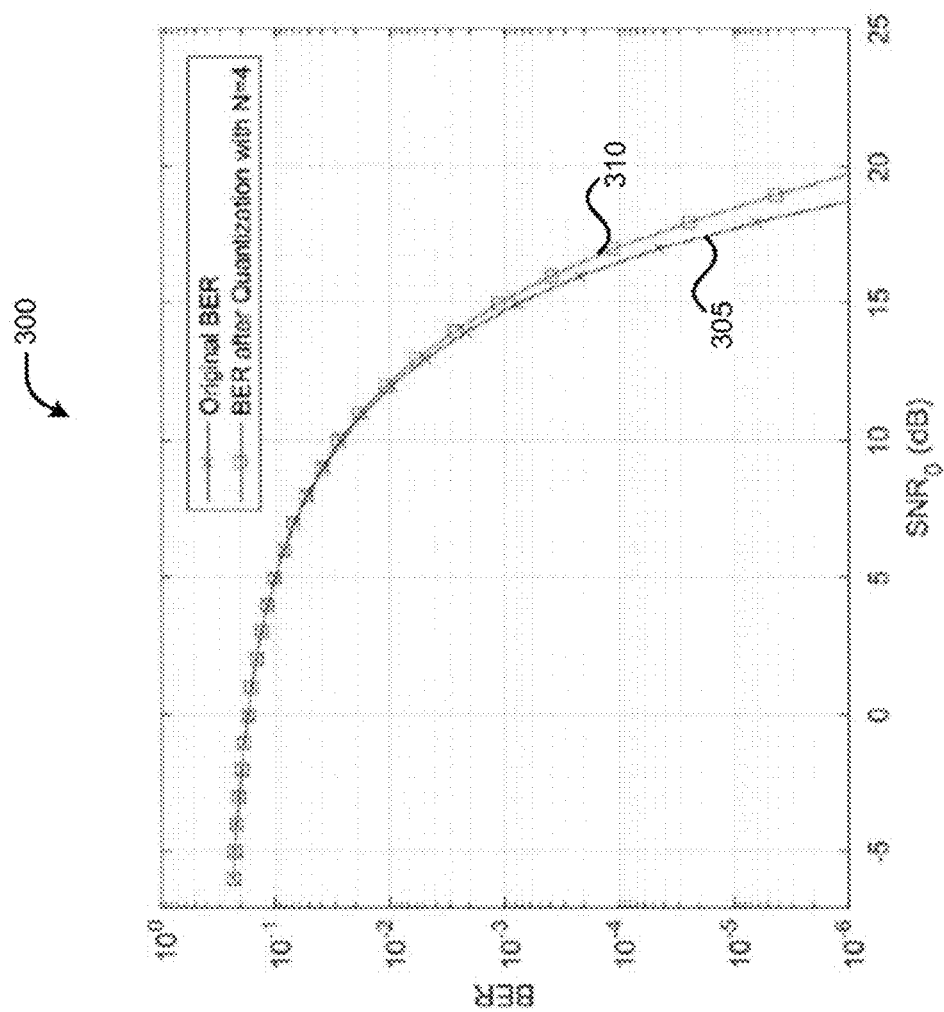
FIG. 3 illustrate a graph of original bit error rate (BER) versus BER after quantization when the quantization precision is 4 bits.

FIG. 3 shows a graph 300 of original BER (line 305 in FIG. 3) versus the BER after quantization when N is 4 bits (line 310 in FIG. 3). Graph 300 illustrates a theoretical BER of 64-QAM in Additive white Gaussian noise (AWGN) as an example to show the influence of SNR degradation on BER. As shown by graph 300, the BER decreases as $SNR_0$ increases for both line 310 and line 305, while the difference between the BER after 4 bit quantization and the original BER increases as the SNR increases. However, even with a relatively high $SNR_0$, the BER after 4-bit quantization is higher than the original PER, it is still low enough for most applications.

Based on graphs 201, 202, and 300, reduced quantization precision will likely not negatively affect signal reconstruction, which means that data can be correctly recovered after demodulation and decoding. The VPFB embodiments discussed herein utilize this principle in order to improve FIFO buffer efficiency by reducing the amount of memory space required for the FIFO buffer and reducing the number of data blocks being dropped when the buffer is full (or almost full). Minimizing the amount of memory space needed for the FIFO buffer allows other applications to utilize that memory space and reduces buffer management complexity. Reducing the number of data blocks being dropped conserves networking and/or signaling resources because allowing more data blocks to be stored in the FIFO buffer should require fewer data retransmissions to properly reconstruct data after it is read out of the FIFO buffer.

Figure 4:
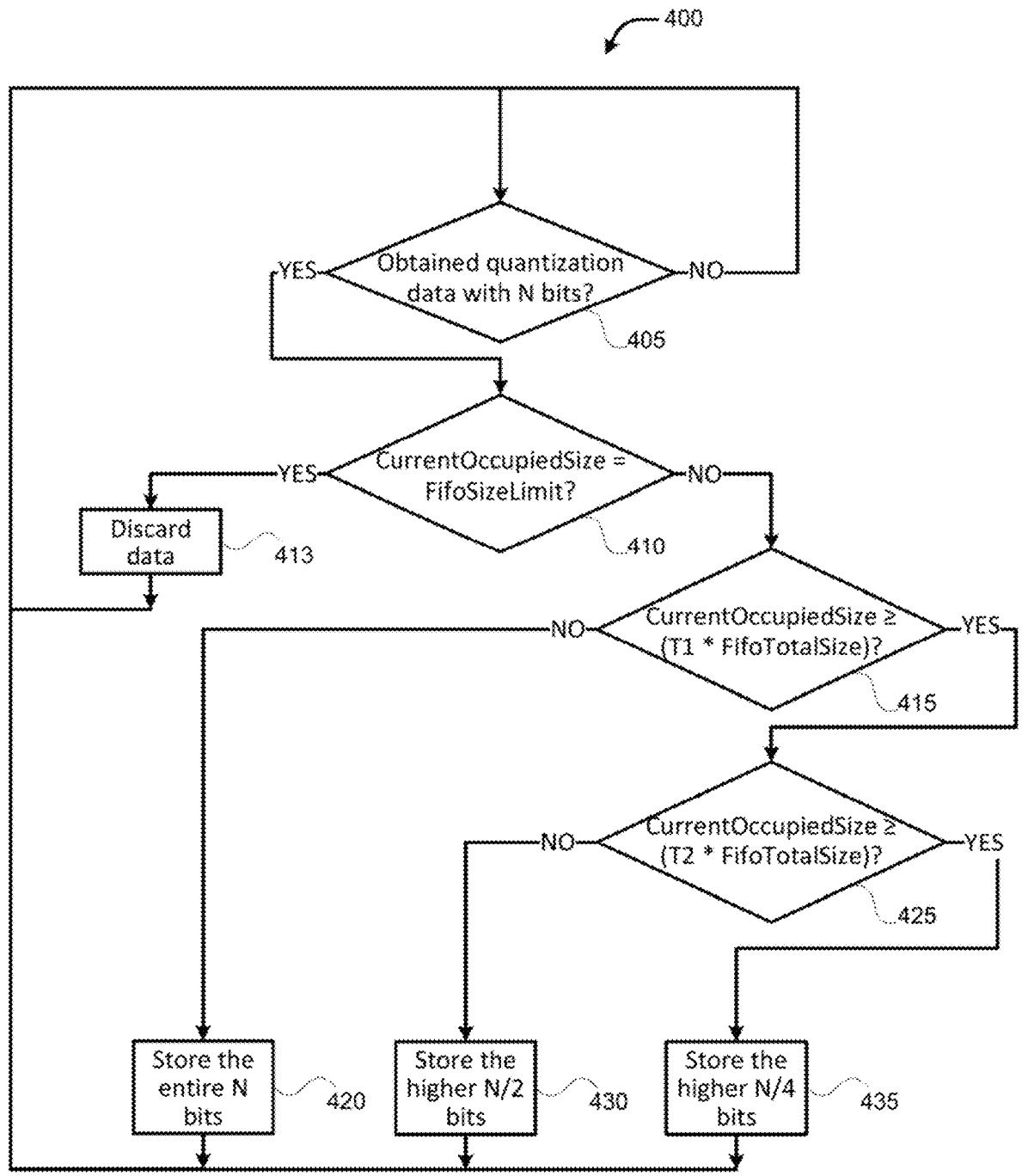
FIG. 4 illustrates an example procedure for practicing aspects of the data stored or free space based FIFO embodiments as discussed herein.

FIG. 4 shows an example VPFB process 400 in accordance with various embodiments. For illustrative purposes, the various operations of process 400 are described as being performed by the controller 150 of FIG. 1 with respect to the VPFB 100 of FIG. 1. The process 400 is described in the context where the VPFB 100 is implemented in an analog receiver, however, the aspects of process 400 may be applied to other use cases. Moreover, while particular examples and orders of operations are illustrated FIG. 4, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 400 begins at operation 405 where the controller 150 determines whether quantization data (e.g., a new block 105 comprising N number of bits) has arrived for storage in the VPFB 100. If at operation 405 the controller 105 determines that no data has arrived for storage in the VPFB 100, the controller 150 loops back to perform operation 405 and continues to monitor for new data to be stored in the VPFB 100. If at operation 405 the controller 105 determines that data has arrived for storage in the VPFB 100, the controller 150 proceeds to operation 410 determine whether a current amount of data stored in the VPFB 100 ("CurrentOccupiedSize") is equal to a size threshold of the VPFB 100 ("FifoSizeLimit"). In some embodiments, the FifoSizeLimit may be the maximum size of the VPFB 100 (e.g., the "FifoTotalSize") or may be set to an "almost full" percentage, such as 90%-99% of the maximum sire of the VPFB 100.

If at operation 410 the controller 105 determines that the CurrentOccupiedSize is equal to the FifoSizeLimit, then the controller 150 proceeds to operation 413 to discard the data block 105, and then proceeds back to operation 405 to monitor for a new data block 105. If at operation 410 the controller 105 determines that the CurrentOccupiedSize is not equal to the FifoSizeLimit, then the controller 150 proceeds to operation 415 to determine whether the CurrentOccupiedSize is greater than or equal to a first threshold. In the example of FIG. 4, the first threshold is a percentage (e.g., 50%) of the FifoTotalSize, which is represented as "T1*FifoTotalSize". In other embodiments, the first threshold may be a percentage of the FifoSizeLimit. In other embodiments, the first threshold may be set to a predetermined value or may be dynamically set based on application parameters.

If at operation 415 the controller 105 determines that the CurrentOccupiedSize is not greater than or equal to the first threshold (i.e., CurrentOccupiedSize is less than the first threshold), then the controller 150 proceeds to operation 420 to control storage of the entire N number of bits in the VPFB 100, and then proceeds back to perform operation 405. If at operation 415 the controller 105 determines that the CurrentOccupiedSize is greater than or equal to the first threshold, then the controller 150 proceeds to operation 425 to determine whether the CurrentOccupiedSize is greater than or equal to a second threshold. In the example of FIG. 4, the second threshold is a percentage (e.g., 75%) of the FifoTotalSize, which is represented as "T2*FifoTotalSize". In other embodiments, the second threshold may be a percentage of the FifoSizeLimit. In other embodiments, the second threshold may be set to a predetermined value or may be dynamically set based on application parameters.

If at operation 425 the controller 105 determines that the CurrentOccupiedSize is not greater than or equal to the second threshold (i.e., CurrentOccupiedSize is less than the second threshold and greater than the first threshold), then the controller 150 proceeds to operation 430 to control storage of half of the data (N/2 number of bits) in the VPFB 100, and then proceeds back to perform operation 405. If at operation 425 the controller 105 determines that the CurrentOccupiedSize is greater than or equal to the second threshold, then the controller 150 proceeds to operation 435 to control storage of a quarter of the data (N/4 number of bits) in the VPFB 100, and then proceeds back to perform operation 405.

Figure 5:
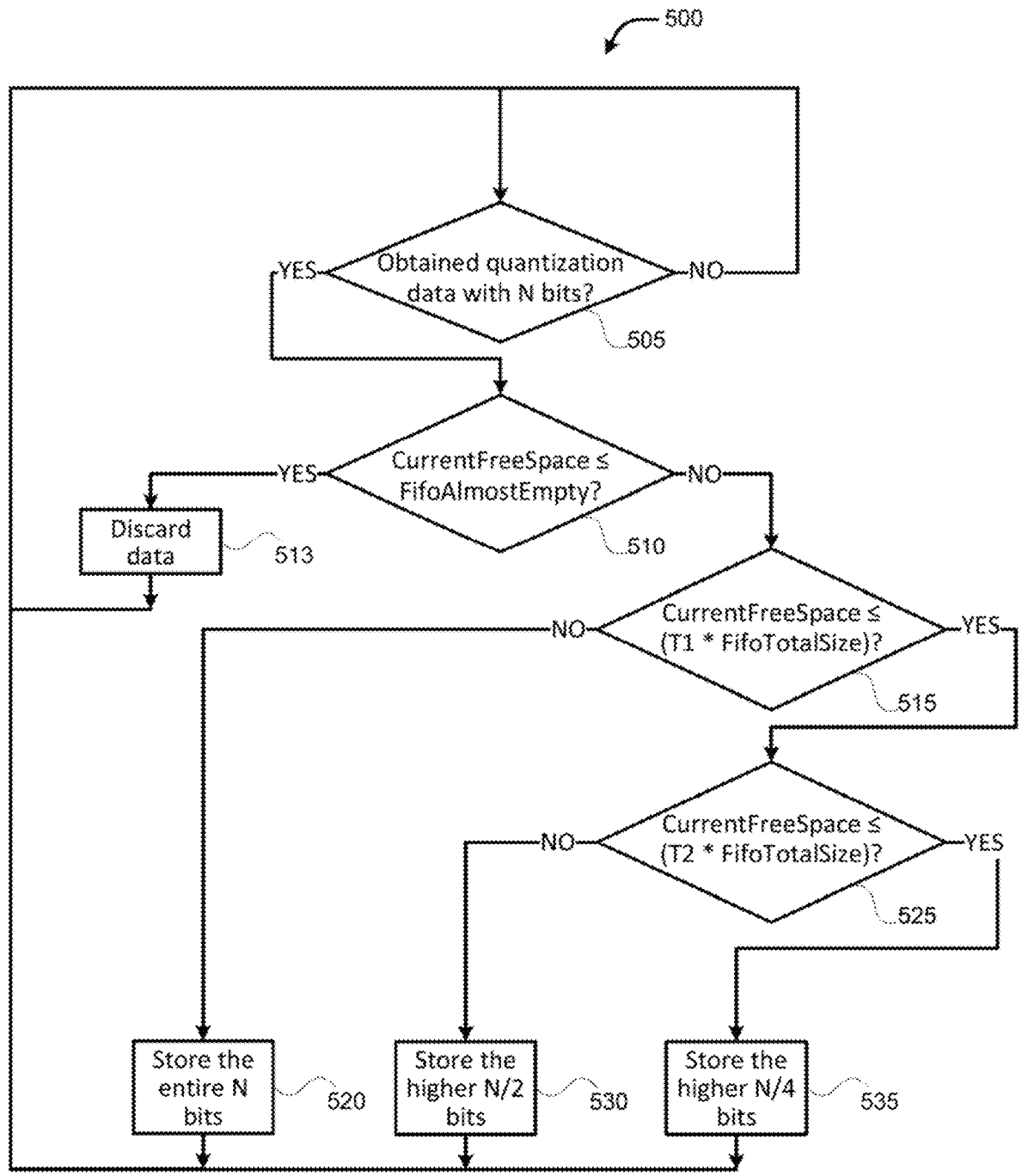
FIG. 5 illustrates another example procedure for practicing aspects of the variable precision FIFO embodiments as discussed herein.

FIG. 5 shows another example VPFB process 500 in accordance with various embodiments. For illustrative purposes, the various operations of process 500 are described as being performed by the controller 150 of FIG. 1 with respect to the VPFB 100 of FIG. 1. The process 500 is described in the context where the VPFB 100 is implemented in an analog receiver, however, the aspects of process 500 may be applied to other use cases. Moreover, while particular examples and orders of operations are illustrated FIG. 5, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 500 begins at operation 505 where the controller 150 determines whether quantization data (e.g., a new block 105 comprising N number of bits) has arrived for storage in the VPFB 100. If at operation 505 the controller 105 determines that no data has arrived for storage in the VPFB 100, the controller 150 loops back to perform operation 505 and continues to monitor for new data to be stored in the VPFB 100. If at operation 505 the controller 105 determines that data has arrived for storage in the VPFB 100, the controller 150 proceeds to operation 510 determine whether a current amount of available memory space in the VPFB 100 ("CurrentFreeSpace") is less than or equal to a free space threshold of the VPFB 100 ("FifoAlmostEmpty"). In some embodiments, the FifoAlmostEmpty may be based on the maximum size of the VPFB 100 (e.g., the "FifoTotalSize") or may be set to an "almost empty" percentage, such as 1% to 10% of the maximum size of the VPFB 100.

If at operation 510 the controller 105 determines that the CurrentFreeSpace is less than or equal to the FifoAlmostEmpty, then the controller 150 proceeds to operation 513 to discard the data block 105, and then proceeds back to operation 505 to monitor for a new data block 105 to be stored in the VPFB 100. If at operation 510 the controller 105 determines that the CurrentFreeSpace is greater than (or not less than or equal to) the FifoAlmostEmpty, then the controller 150 proceeds to operation 515 to determine whether the CurrentFreeSpace is less than or equal to a first threshold. In the example of FIG. 5, the first threshold is a percentage (e.g., 50%) of the FifoTotalSize, which is represented as "T1*FifoTotalSize". In other embodiments, the first threshold may be a percentage of the FifoSizeLimit. In other embodiments, the first threshold may be set to a predetermined value or may be dynamically set based on application parameters. In an alternative embodiment (not shown by FIG. 5), the first threshold in procedure 500 may be another first threshold that is a variant of the first threshold of procedure 400, wherein the controller 150 would determine whether the CurrentFreeSpace is greater than or equal to the first threshold. In this embodiment, the other first threshold one minus the firth threshold of procedure 40 (e.g., 1−(T1*FifoTotalSize)).

If at operation 515 the controller 105 determines that the CurrentFreeSpace is not less than or equal to the first threshold (i.e., CurrentFreeSpace exceeds the first threshold), then the controller 150 proceeds to operation 520 to control storage of the entire N number of bits in the VPFB 100, and then proceeds back to perform operation 505. If at operation 515 the controller 105 determines that the CurrentFreeSpace is less than or equal to the first threshold, then the controller 150 proceeds to operation 525 to determine whether the CurrentFreeSpace is less than or equal to a second threshold. In the example of FIG. 5, the second threshold is a percentage (e.g., 25%) of the FifoTotalSize, which is represented as "T2*FifoTotalSize". In other embodiments, the second threshold may be a percentage of the FifoSizeLimit. In other embodiments, the second threshold may be set to a predetermined value or may be dynamically set based on application parameters. In an alternative embodiment (not shown by FIG. 5), the second threshold in procedure 500 may be another second threshold that is a variant of the second threshold of procedure 400, wherein the controller 150 would determine whether the CurrentFreeSpace is greater than or equal to the second threshold. In this embodiment, the other second threshold may be one minus the second threshold of procedure 400 (e.g., 1−(T2*FifoTotalSize)).

If at operation 525 the controller 105 determines that the CurrentFreeSpace is not less than or equal to the second threshold (i.e., CurrentFreeSpace is greater than the second threshold and less than the first threshold), then the controller 150 proceeds to operation 530 to control storage of half of the data (N/2 number of bits) in the VPFB 100, and then proceeds back to perform operation 55. If at operation 525 the controller 105 determines that the CurrentFreeSpace is less than or equal to the second threshold, then the controller 150 proceeds to operation 535 to control storage of a quarter of the data (N/4 number of bits) in the VPFB 100, and then proceeds back to perform operation 505.

Figure 6:
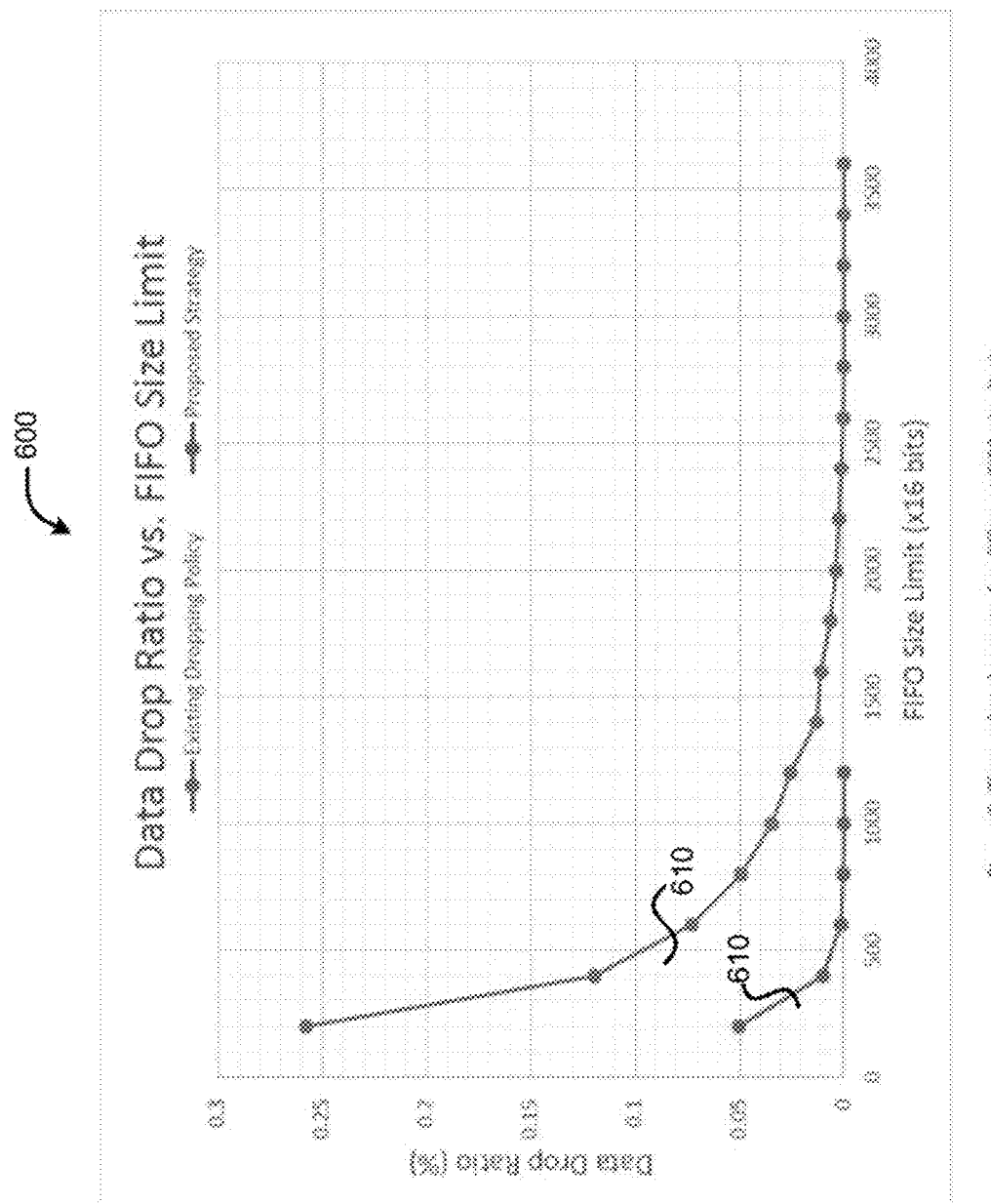
FIG. 6 illustrate a graph showing a data drop ratio versus FIFO buffer size limit for existing FIFO management procedures and for the variable precision FIFO procedures.

FIG. 6 illustrates a graph 600 showing a data drop ratio versus FIFO buffer size limit for both an existing FIFO management procedure and for a VPFB procedure. Graph 600 is based on simulation of a FIFO buffer utilizing the conventional FIFO buffer procedure and the VPFB procedure 400/500. In the simulation, the conventional FIFO included a drop policy of dropping incoming data blocks when the FIFO buffer was full and without a variable precision selection mechanisms, whereas the VPFB procedure included the variable precision selection as discussed previously with regard to procedure 40 of FIG. 4 and/or procedure 50 of FIG. 5. The selection strategy of the simulated VPFB procedure included a T1 of 50% and a T2 of 75%. Results of the simulation is shown by table 1.

TABLE 1

VPFB procedure vs. convention
FIFO procedure simulation results

| FIFO Buffer Size Limit (×16 bits) | Data Drop Ratio (%) | |
|---|---|---|
| | Conventional FIFO Procedure | VPFB Procedure |
| 200 | 0.257682 | 0.0502997 |
| 400 | 0.119308 | 0.0099933 |
| 600 | 0.0728005 | 0.0012523 |
| 800 | 0.0490865 | 0.0001921 |
| 1000 | 0.0342784 | 0 |
| 1200 | 0.0253114 | 0 |
| 1400 | 0.0129882 | 0 |
| 1600 | 0.0107826 | 0 |
| 1800 | 0.0062789 | 0 |
| 2000 | 0.0037403 | 0 |
| 2200 | 0.0023497 | 0 |
| 2400 | 0.0010852 | 0 |
| 2600 | 0.0001677 | 0 |
| 2800 | 0.0001404 | 0 |
| 3000 | 6.25E−05 | 0 |
| 3200 | 2.90E−05 | 0 |
| 3400 | 2.90E−05 | 0 |
| 3600 | 0 | 0 |

The simulation producing the results of table 1 included a constant data arrival rate or data to-be-written rate (R_in) of 160 bits per second (bps); a data handling rate or data to-be-read rate (R_out) that followed a Poisson distribution with a mean of 160 bps; and quantization data (i.e., data block size/length) of 16 bits. The simulation included 1000 trials for each of the FIFO buffer sizes listed in table 1. Each trial was run for 100,000 seconds (i.e., 27.777778 hours), and each result listed in table 1 is an average of 1000 runs.

The data drop ratio in table 1 is defined as the number of data block drops per each block to be written to the FIFO buffer, and may be expressed as shown by equation 7.

$$DDR = \frac{T_{dropped}}{T_{arrived}} \quad \text{[equation 7]}$$

In equation 7, DDR is the data drop ratio expressed as a percentage; $T_{dropped}$ is the total number of data blocks 105 dropped or discarded by the controller 150; and $T_{arrived}$ is the total number of data blocks 105 that arrived at the FIFO buffer for storage in the FIFO buffer.

As can be seen by table 1 and graph 600 of FIG. 6, for both FIFO buffer management mechanisms, the data drop ratio decreases as the FIFO buffer size increases. The results show that for a given a FIFO buffer size limit the VPFB procedures significantly reduce the data drop ratio by over 80% as compared to the conventional FIFO buffer data dropping policy. As shown by table 1 and graph 600, in order to achieve a data drop ratio of 0% (i.e., to not drop any data blocks 105), the existing FIFO buffer dropping policy requires a FIFO buffer having a FifoTotalSize of around 57,600 bits (e.g., FIFO buffer size limit of 3600×16 bits in table 1) or 7.200 bytes. By contrast, the VPFB procedures only require a FifoTotalSize of around 16,000 bits (e.g., FIFO buffer size limit of 1000×16 bits in table 1) or 2,000 bytes. Therefore, the FifoTotalSize using the the VPFB procedures is about 28% of that of the existing FIFO buffers using the conventional dropping policy. In other words, the VPFB procedures can conserve storage resources by reducing the size of a FIFO buffer by more than 70%.

II. Example Implementations

Figure 7:
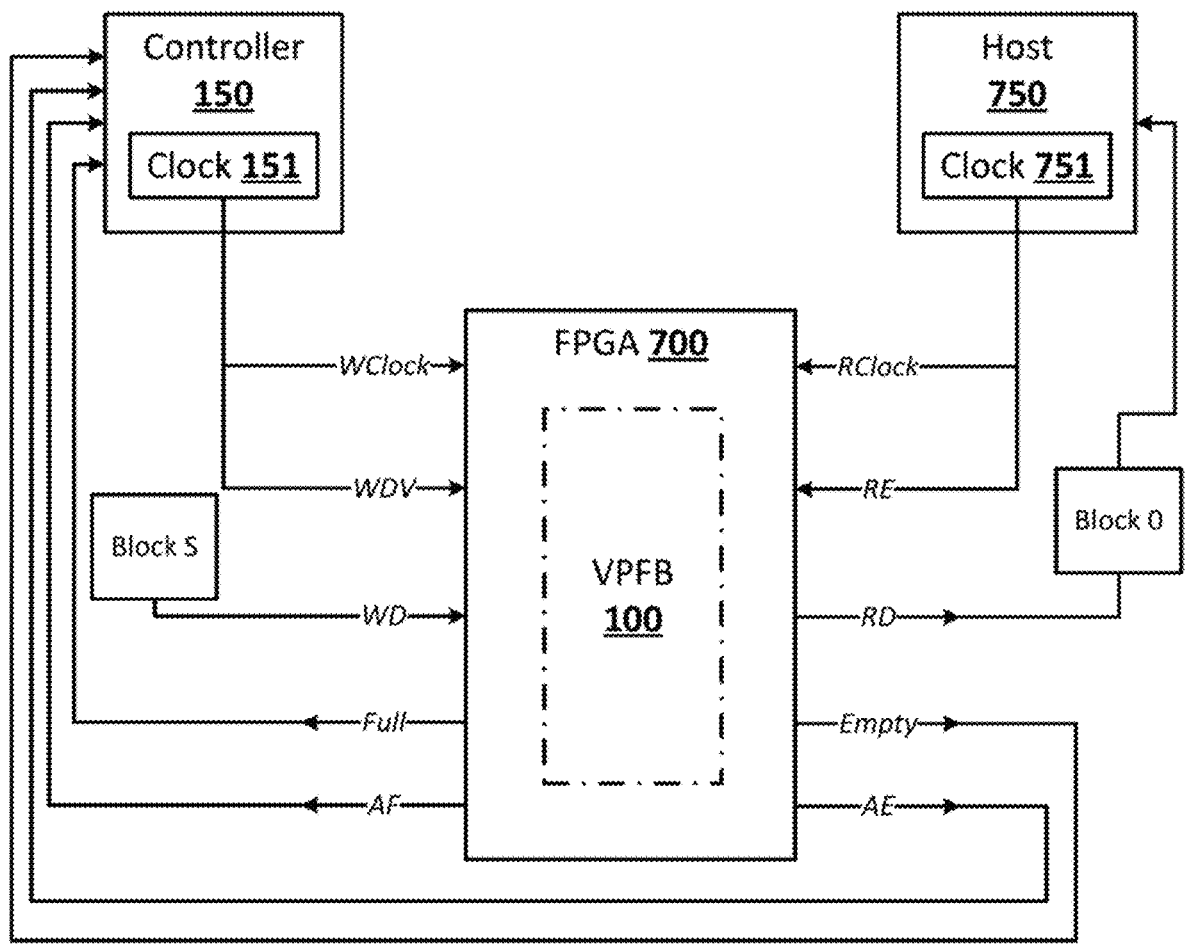
FIG. 7 illustrates a field programmable gate array device that may be used to practice the embodiments discussed herein.

FIG. 7 illustrates an FPGA 700 that may be used to practice the embodiments discussed herein. Components as shown by FIG. 7 are shown for illustrative purposes and may include other components not shown by FIG. 7, or the elements shown by FIG. 7 may by alternatively be grouped according to functions.

As shown, the FPGA 700 is communicatively coupled with the controller 150 of FIG. 1 and a host platform 750, where the FPGA 700 is to implement the VPFB 100 discussed previously (and may operate one or both of VPFB procedures 400 and 500 of FIGS. 4 and 5). In this example, the controller 150 includes a clock 151 and the host 750 includes a clock 751, where the clock rate of clock 151 is different from (e.g., faster or slower than) the clock rate or clock 751. The data to be stored by the VPFB 100 is to cross a clock domain of the controller 150 and the host 750.

The FPGA 700 includes a write clock line (WClock), a write data valid line (WDV), a write data line (WD), a data full line (Full), an almost full line (AF), an data empty line (Empty), and an almost empty line (AE), each of which are connected to the controller 150. The FPGA 700 also includes a read clock line (RClock), a read enable line (RE), and a read data line (RD) connected to the host 750. To write data into the VPFB 100, a clock pulse of clock 151 is input to the WDV and block S is placed on the WD. To read data from the VPFB 100, the RE is set to high based on a clock pulse of clock 751, and a block 105 is pulled from the VPFB 100 on the RD In some embodiments, multiple blocks 105 may be written to the VPFB 100 (e.g., "data bursts") according to the clock cycle of clock 151, and multiple blocks can be read from the VPFB 100 (e.g., "data chunks") according to the clock cycle of clock 751. For example, if the clock 751 has a frequency of 60 hertz (Hz), then 16 blocks 105 may be written to the VPFB 100 per clock cycle The FPGA 700 may include one or more configurable logic blocks (CLBs) or logic cells comprising lookup-tables (LUTs) and flip-flops, one or more memory cells (e.g., block Random Access Memory (BRAM)), digital signal processing (DSP) slices, serial data transceivers, input/output (I/O) blocks, and/or other like components. In this example, the CLBs of the FPGA 700 are loaded with the appropriate logic to select the data size (block length) of data blocks 105 according to VPFB procedure 400 or 500. The logic loaded into the FPGA 700 may be developed using an appropriate hardware description language (HDL), such as register-transfer logic (RTL), very high speed integrated circuit (VHSIC) HDL (VHDL), Verilog, and the like.

The data size (block length) of the arriving blocks 105 may be based on signals sent over the Full, AF, Empty, and/or AE. In embodiments, the Full, AF, Empty, and/or AE signals may be sent to the controller 150 every clock cycle of clock 151 or in response to a request from the controller 150. A signal is sent on the Full when the VPFB 100 is at full capacity (i.e., no more data can be stored in the VPFB 100) and a signal may be sent on the AF when the VPFB 100 includes a predetermined number of blocks 105. Additionally, a signal is sent on the Empty when the VPFB 100 is completely empty (i.e., no data stored in the VPFB 100) and a signal may be sent on the AE when the VPFB 100 includes a predetermined number of blocks 105, wherein AF is greater than AE. In the example of FIG. 7, the values (number of blocks 105) for AF and/or AE may be set based on the T1 or T2 values discussed previously.

Figure 8:
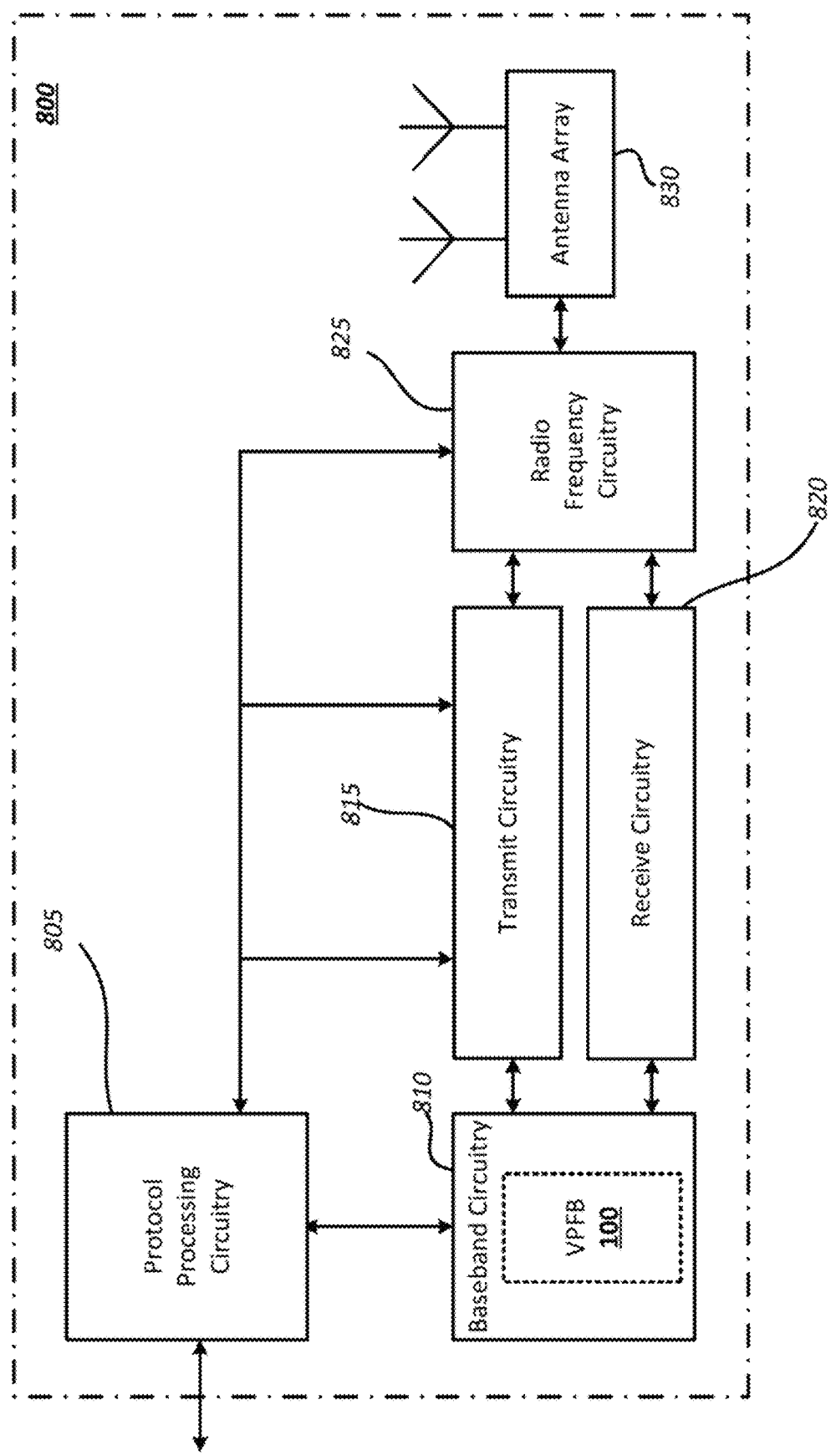
FIG. 8 illustrates an example of communication circuitry that may be used to practice the embodiments discussed herein.

FIG. 8 illustrates an example of communication circuitry 800 that may be used to practice the embodiments discussed herein. Components as shown by FIG. 8 are shown for illustrative purposes and may include other components not shown by FIG. 8, or the elements shown by FIG. 8 may by alternatively be grouped according to functions.

The communication circuitry 800 includes protocol processing circuitry 805, which operates or implements various protocol layers/entities of one or more wireless communication protocols. In one example, the protocol processing circuitry 805 may operate Long Term Evolution (LTE) protocol entities and/or Fifth Generation (5G)/New Radio (NR) protocol entities when the communication circuitry 80 is a cellular radiofrequency communication system, such as millimeter wave (mmWave) communication circuitry or some other suitable cellular communication circuitry. In this example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In another example, the protocol processing circuitry 805 may operate one or more IEEE-based protocols when the communication circuitry 800 is WiFi communication system. In this example, the protocol processing circuitry 805 would operate MAC and logical link control (LLC) functions.

The protocol processing circuitry 805 may include one or more memory structures (not shown) to store program code and data information for operating the protocol functions, as well as one or more processing cores (not shown) to execute the program code and perform various operations using the data information. The protocol processing circuitry 805 may include one or more instances of control circuitry (not shown) to provide control functions for the baseband circuitry 810, transmit circuitry 815, receive circuitry 820, and/or radiofrequency (RF) circuitry 825.

The communication circuitry 80 also includes baseband circuitry 810, which implements physical layer (PHY) functions including hybrid automatic repeat request (HARQ) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions, etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

Baseband processing circuitry 810 and/or protocol processing circuitry 805 may interface with an application platform (not shown by FIG. 8) for generation and processing of baseband signals and for controlling operations of the RF circuitry 825. The baseband circuitry 810 may handle various radio control functions that enable communication with one or more radio networks via the RF circuitry 825. The baseband circuitry 810 may include circuitry such as, but not limited to, one or more single-core or multi-core processors (e.g., one or more baseband processors) or control logic to process baseband signals received from a receive signal path of the RF circuitry 825 (e.g., via Rx circuitry 820) and to generate baseband signals for a transmit signal path of the RF circuitry 825 (e.g., via Tx circuitry 815). The baseband circuitry 810 may comprise a multi-protocol baseband processor 900, which is described in more detail with regard to FIG. 9.

The communication circuitry 800 also includes transmit (Tx) circuitry 815 and receive (Rx) circuitry 820. The Tx circuitry 815 is configured to convert digital baseband signals into analog signals for transmission by the RF circuitry 825. To do so, in one embodiment, the Tx circuitry 815 includes various components, such as digital to analog converters (DACs), analog baseband circuitry, up-conversion circuitry, and filtering and amplification circuitry. In another embodiment, the Tx circuitry 815 may include digital transmit circuitry and output circuitry. The Rx circuitry 820 is configured to convert analog signals received by the RF circuitry 825 into digital baseband signals to be provided to the baseband circuitry 810. To do so, in one embodiment, the Rx circuitry 820 includes parallel receive circuitry and/or one or more instances of combined receive circuitry. The parallel receive circuitry and instances of the combined receive circuitry may include Intermediate Frequency (IF) down-conversion circuitry, IF processing circuitry, baseband down-conversion circuitry, baseband processing circuitry, and analog-to-digital converter (ADC) circuitry.

The communication circuitry 800 also includes radiofrequency (RF) circuitry 825 to enable communication with wireless networks using modulated electromagnetic radiation through a non-solid medium. The RF circuitry 825 includes a receive signal path, which may include circuitry to convert analog RF signals (e.g., an existing or received modulated waveform) into digital baseband signals to be provided to the baseband circuitry 810 via the Rx circuitry 820. The RF circuitry 825 also includes a transmit signal path, which may include circuitry configured to convert digital baseband signals provided by the baseband circuitry 810 via the Tx circuitry 815 to be converted into analog RF signals (e.g., modulated waveform) that will be amplified and transmitted via the antenna array 830.

RF circuitry 825 may include one or more instances of radio chain circuitry, which may include one or more filters, power amplifiers, low noise amplifiers, programmable phase shifters, and power supplies (not shown). Radio frequency circuitry 825 may also include power combining and dividing circuitry. The power combining and dividing circuitry may operate bidirectionally, such that the same physical circuitry may be configured to operate as a power divider when the device is transmitting, and as a power combiner when the device is receiving. In some embodiments, the power combining and dividing circuitry may include wholly or partially separate circuitries to perform power dividing when the device is transmitting and power combining when the device is receiving. The power combining and dividing circuitry may include passive circuitry comprising one or more two-way power divider/combiners arranged in a tree. In some embodiments, the power combining and dividing circuitry may include active circuitry comprising amplifier circuits.

According to various embodiments, the baseband circuitry 810 may implement the VPFB 100 and operate VPFB procedures 400/500 to buffer samples of the digital baseband signals to be provided to the RF circuitry 825 and/or to buffer samples of the digital baseband signals produced by the RF circuitry 825. The digital baseband samples may be in-phase and quadrature (I/Q) samples and/or the like. In these embodiments, the samples are stored in a VPFB 100, and the baseband circuitry 810 selects the quantization precision of the samples based on the current amount of data stored in the VPFB 100 or the currently available space in the VPFB 100 as discussed previously with regard to FIGS. 1-6.

The communication circuitry 800 also includes antenna array 830. The antenna array 830 include one or more antenna elements. The antenna array 830 may be a plurality of microstrip antennas or printed antennas that are fabricated on the surface of one or more printed circuit boards. The antenna array 830 may be formed in as a patch of metal foil (e.g., a patch antenna) in a variety of shapes, and may be coupled with the RF circuitry 825 using metal transmission lines or the like.

Figure 9:
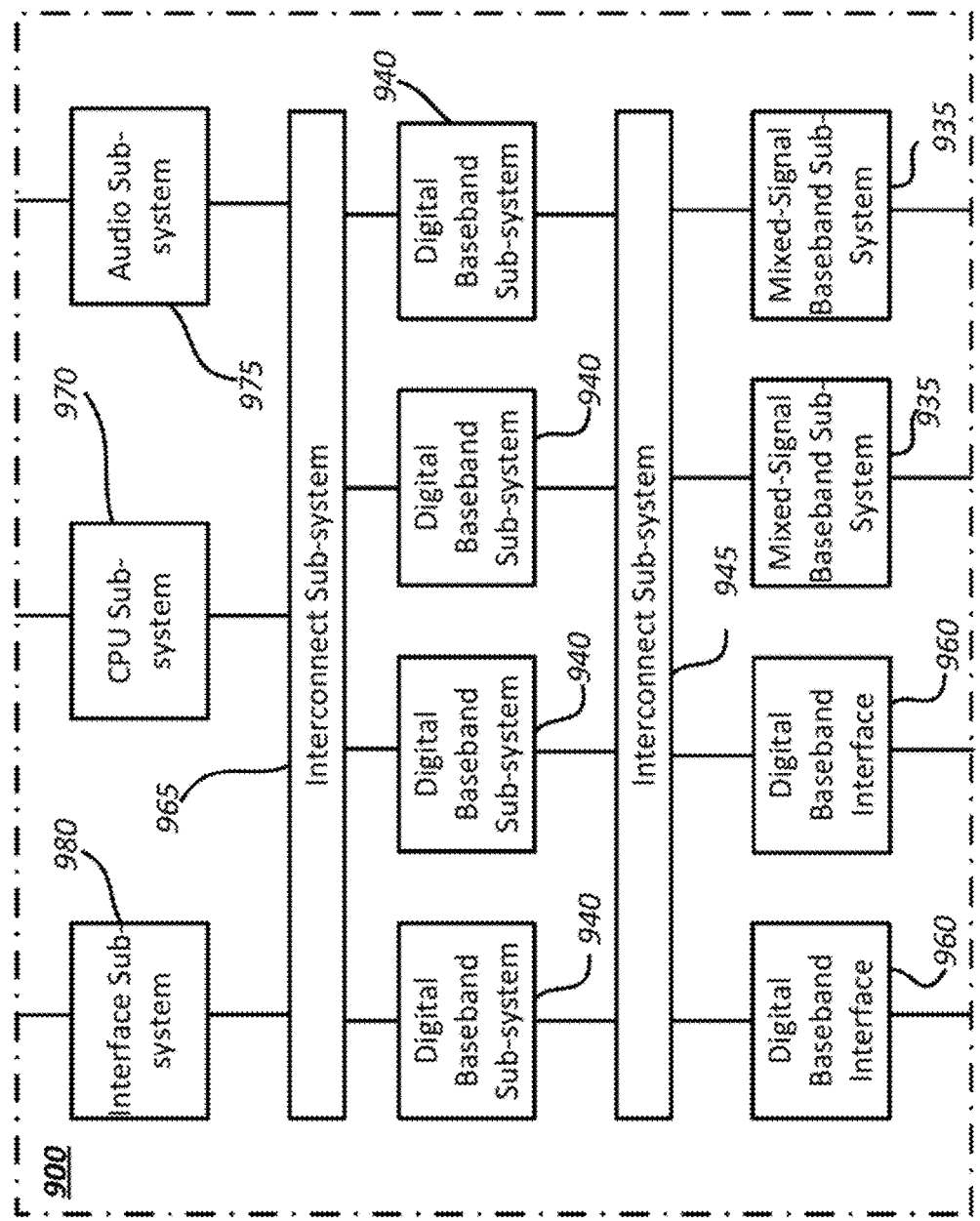
FIG. 9 illustrates a multi-protocol baseband processor according to various embodiments.

FIG. 9 illustrates a multi-protocol baseband processor 900 according to various embodiments. The multi-protocol baseband processor 900 may also support radio communications of more than one wireless protocol (e.g., E-UTRAN or other WMAN, a WLAN, a WPAN, etc.), and in such cases, baseband processor 900 may be referred to as a "multi-mode baseband processor." As shown, baseband processor 900 includes one or more digital baseband systems 940, coupled via interconnect subsystem 965 to a CPU subsystem 970, audio subsystem 975, and interface subsystem 980. The one or more digital baseband subsystems 940 are also coupled via interconnect subsystem 945 to one or more digital baseband interfaces 960 and one or more mixed-signal baseband sub-systems 935.

The interconnect subsystems 965 and 945 may each include one or more of each of buses point-to-point connections and network-on-chip (NOC) structures. The audio subsystem 975 may include various elements for compression/decompression and echo cancellation and may include other suitable processing elements in other embodiments. These elements may include digital signal processing circuitry, buffer memory, program memory, speech processing accelerator circuitry, data converter circuitry such as analog-to-digital and digital-to-analog converter circuitry, and analog circuitry including one or more of amplifiers and filters. The mixed-signal baseband sub-system 935 includes an IF interface, analog IF subsystem, downconverter and upconverter subsystem, analog baseband subsystem, data converter subsystem, synthesizer, and control sub-system. According to various embodiments, the one or more digital baseband subsystems 940 implement the VPFB 100 as shown by FIG. 10.

Figure 10:
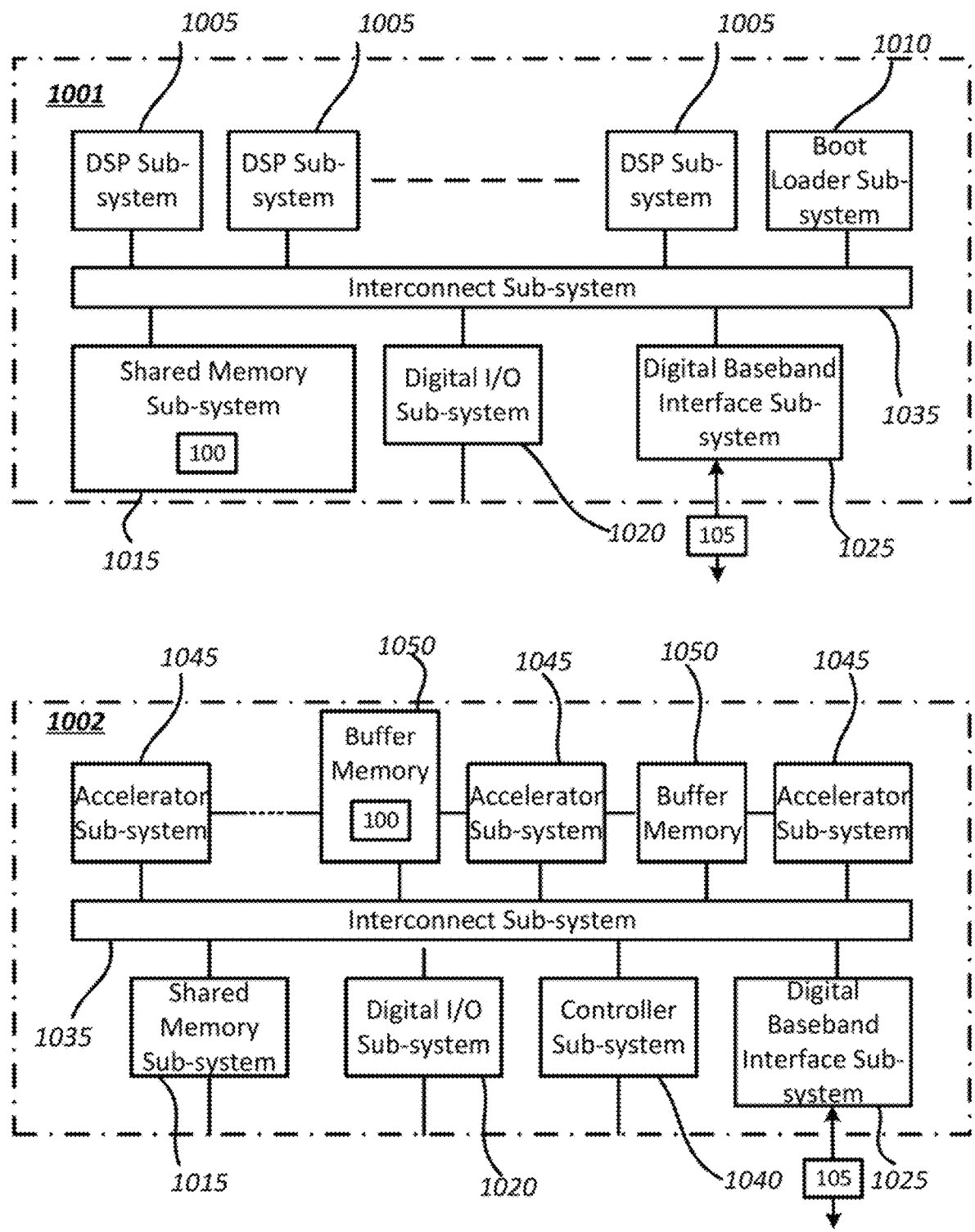
FIG. 10 shows components of a digital baseband subsystem according to a various embodiment.

FIG. 10 shows components of a digital baseband subsystem 1001 according to a first embodiment, and components of a digital baseband subsystem 102 according to a second embodiment. The digital baseband subsystem 1001 and/or 1002 correspond to the one or more digital baseband systems 940 of FIG. 9. Additionally, the multi-protocol baseband processor 900 of FIG. 9 may include one or both of the baseband processing subsystems 1001 and 1002.

The baseband processing subsystem 1001 includes one or more of each of DSP subsystems 1005, interconnect subsystem 1035, boot loader subsystem 1010, shared memory subsystem 1015, digital I/O subsystem 1020, digital baseband interface subsystem 1025, and audio subsystem 1030. The boot loader subsystem 1010 includes digital logic circuitry configured to perform configuration of the program memory and running state associated with each of the one or more DSP subsystems 1005. Configuration of the program memory of each of the one or more DSP subsystems 1005 includes loading executable program code from storage circuitry external to the baseband processing subsystem 1001 (not shown by FIG. 10). Configuration of the running state associated with each of the one or more DSP subsystems 1005 may include one or more of the following operations: setting the state of at least one DSP core which may be incorporated into each of the one or more DSP subsystems 1005 to a state in which it is not running, and setting the state of at least one DSP core which may be incorporated into each of the one or more DSP subsystems 1005 into a state in which it begins executing program code starting from a predefined memory location.

The shared memory subsystem 1015 includes one or more of read-only memory (ROM), static random access memory (SRAM), embedded dynamic random access memory (eDRAM), and/or non-volatile random access memory (NVRAM). The digital I/O subsystem 1020 includes one or more serial interfaces and/or one or more parallel interfaces. Examples of the one or more serial interfaces may include I²C, SPI, and/or other 1, 2 or 3-wire serial interfaces. Examples of the one or more parallel interfaces s may include general-purpose input-output (GPIO), register access interfaces, and/or direct memory access (DMA). A register access interface implemented in the digital I/O subsystem 1020 may permit a microprocessor core external to baseband processing subsystem 1001/1002 to read and/or write to control and data registers and memory. The DMA logic circuitry implemented in the digital I/O subsystem 1020 may permit transfer of contiguous blocks of data (e.g., data blocks 105) between memory locations including memory locations internal and external to baseband processing subsystem 1001.

The digital baseband interface subsystem 1025 provides for the transfer of digital baseband samples between the baseband processing subsystem 1001 and RF circuitry 825, and/or between the baseband processing subsystem 1001 and a mixed signal baseband subsystem external to baseband processing subsystem 1001. According to various embodiments, the digital baseband samples are transferred from a FIFO buffer (e.g., a VPFB 100) to/from the RF circuitry 825 or the external mixed signal baseband subsystem, and the quantized precision of the samples may change based on the current size of the FIFO buffer. Examples of the digital baseband samples transferred by the digital baseband interface subsystem 1025 may include in-phase and quadrature (I/Q) samples and/or the like.

The baseband processing subsystem 1002 includes an accelerator subsystem 1045, buffer memory 1050, interconnect subsystem 1035, audio subsystem 1030, shared memory subsystem 1015, digital I/O subsystem 1020, controller subsystem 1040, and digital baseband interface subsystem 1025. Like numbered items of the baseband processing subsystem 1002 are the same as described with respect to the baseband processing subsystem 1001.

The controller subsystem 1040 includes one or more of each of control and status registers and control state machines. The control and status registers may be accessed via a register interface and may provide for one or more of: starting and stopping operation of control state machines, resetting control state machines to a default state, configuring optional processing features, configuring the generation of interrupts and reporting the status of operations. In embodiments, each of the control state machines may control the sequence of operation of each of the one or more accelerator subsystems 1045.

According to various embodiments, the shared memory subsystem 1015 of the baseband processing subsystem 1001/1002 or the buffer memory 1050 of baseband processing subsystem 1002 implements the VPFB 100 discussed previously. In these embodiments, a memory space or region of the shared memory subsystem 1015 is used for a FIFO buffer. In these embodiments, at least one DSP subsystem 1005 is to receive a data block 105 (e.g., a quantized data sample) to be stored in the FIFO buffer, selects a size of the received data block 105 (e.g., a number of bits of a quantized data sample) to be stored in the FIFO buffer based on a current amount of data stored in the FIFO buffer or an amount of currently free space available in the FIFO buffer; and controls storage of data block 105 (e.g., the quantized data sample) with the selected size in the FIFO buffer.

Figure 11:
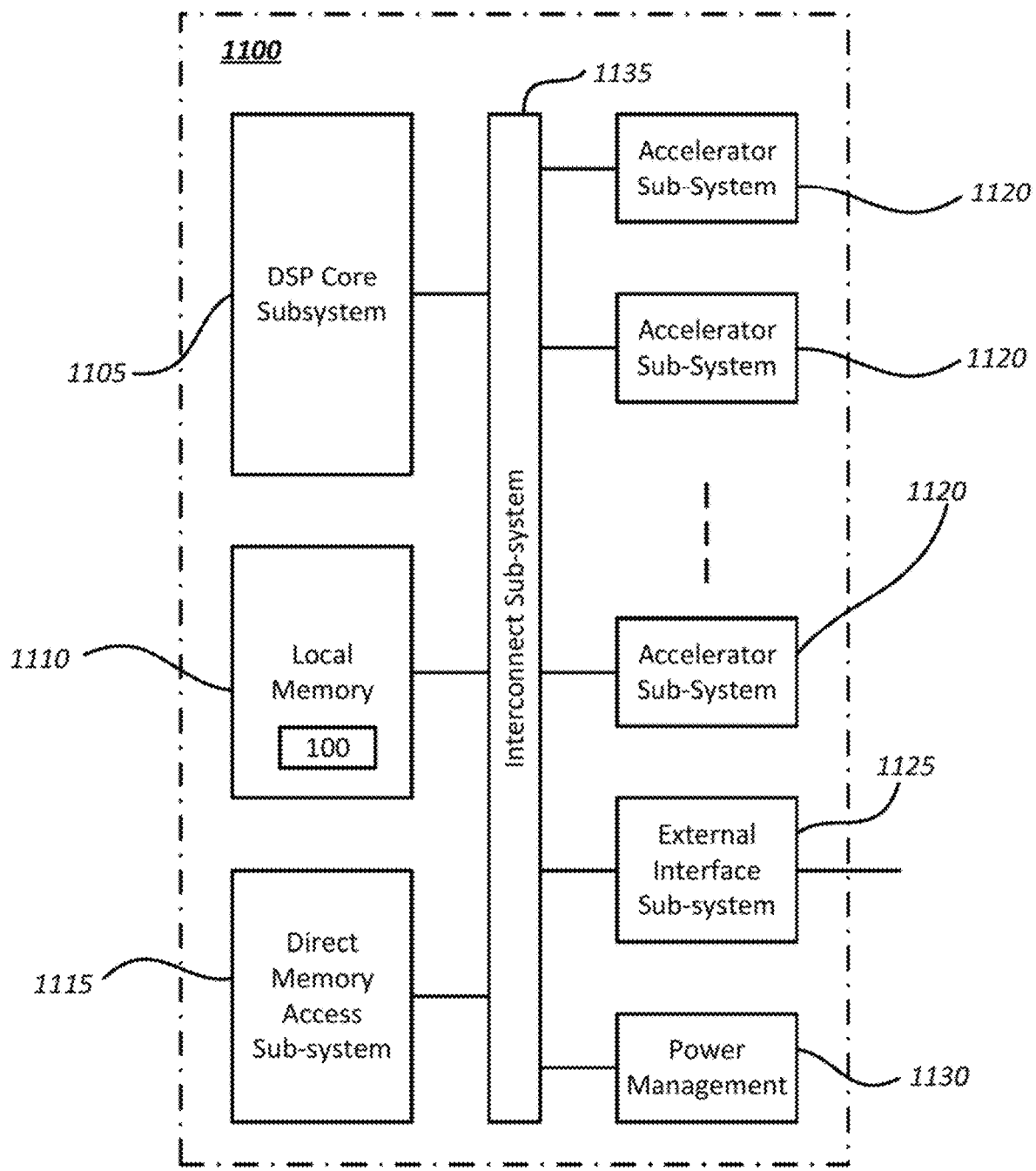
FIG. 11 illustrates a digital signal processor (DSP) subsystem according to various embodiments.

FIG. 11 illustrates a digital signal processor (DSP) subsystem 1100 that may be used according to various embodiments. The DSP subsystem 1100 corresponds to the DSP subsystems 1005 of the baseband processing subsystem 1001 of FIG. 10. The DSP subsystem 1100 includes DSP core subsystem 1105, local memory 1110, direct memory access (DMA) subsystem 1115, accelerator subsystem 1120, external interface subsystem 1125, power management unit 1130, and interconnect subsystem 1135.

The local memory 1110 includes various memory devices, such as ROM, SRAM, and/or eDRAM. The DMA subsystem 1115 provides registers and control state machine circuitry adapted to transfer blocks of data between memory locations including memory locations internal and external to digital signal processor subsystem 1100. The external interface subsystem 1125 provides access by a microprocessor system external to DSP subsystem 1100 to memory, control registers, and status registers, which may be implemented in the DSP subsystem 1100. The external interface subsystem 1125 provides for the transfer of data between the local memory 1110 and storage external to DSP subsystem 1100 under the control of the DMA subsystem 1115 and/or the DSP core subsystem 1105.

According to various embodiments, the local memory 1110 implements a VPFB 100 discussed previously. In these embodiments, a memory space or region of the local memory 1110 is used for a FIFO buffer, and the DSP core subsystem 1105 is to receive a data block 105 (e.g., a quantized data sample) to be stored in the FIFO buffer, selects a size of the received data block 105 (e.g., a number of bits of a quantized data sample) to be stored in the FIFO buffer based on a current amount of data stored in the FIFO buffer or an amount of currently free space available in the FIFO buffer; and controls storage of data block 105 (e.g., the quantized data sample) with the selected size in the FIFO buffer.

Figure 12:
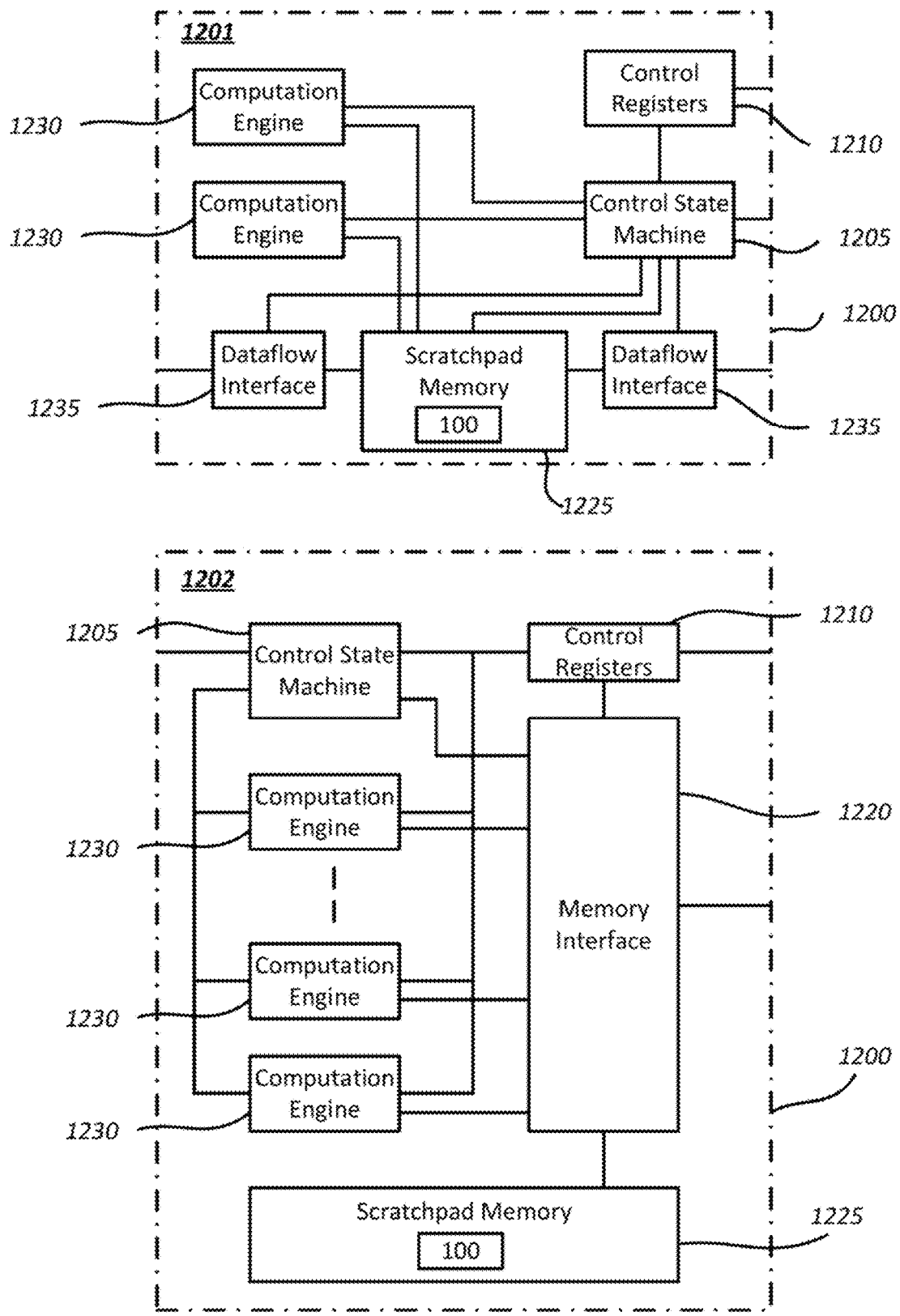
FIG. 12 shows components of an accelerator subsystems according to various embodiments.

FIG. 12 shows components of an accelerator subsystem 1201 according to a first embodiment, and components of an accelerator subsystem 1202 according to a second embodiment. The accelerator subsystems 1201 and 1202 may correspond to the accelerator subsystems 1045 of FIG. 10 and/or the accelerator subsystems 1120 of FIG. 11.

The accelerator subsystem 1201 and 1202 include a control state machine 1205, control registers 1210, scratchpad memory 1225, and computation engines 1230. The accelerator subsystem 1201 includes dataflow interfaces 1235, whereas the accelerator subsystem 1202 includes a memory interface 1220.

The control registers 1210 configure and control the operation of accelerator subsystem 1200. The operation of the accelerator subsystem 1200 includes one or more of enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

The control state machine 1205 controls the sequence of operations of the accelerator subsystem 1201/1202. Such sequence of operations may include one or more of: configuring, activating, and deactivating one or more or each of memory interface 1220, computation engine 1230, scratchpad memory 1225, and dataflow interface 1235 (for accelerator subsystem 1201). The control state machine 1205 starts and stops performance of the operations based on control information written to control bits contained in the control registers 1210. The control state machine 1205 also updates the value of status bits contained in the control registers 1210. The control state machine may access data structures stored in memory that is internal or external to accelerator subsystem 1201/1202, in order to perform one or more of the configuring operations and reporting results or status information of the accelerator subsystem 120111202.

The computation engines 1230 are logic circuit elements configured to perform one or more predetermined computation operations. The computation operations may have configurable parameters and may be configured to operate in a configured sequence. In embodiments, the computation engines 1230 include storage elements for storing one or more operational states and intermediate results.

The scratchpad memory 1225 provide for storage of data in one or more of SRAM, eDRAM, a register file (which may comprise flip-flops or latches), a FIFO memory, or some other suitable data storage structure. According to various embodiments, the FIFO memory of the scratchpad memory 1225 is a VPFB 100 that operates according to a VPFB procedure 400 and/or 500 discussed previously. In these embodiments, the control state machine 1205 or one or more of the computation engines 1230 corresponds to the controller 150.

Referring to the accelerator subsystem 1201, the dataflow interface 1235 includes circuitry configured to perform input and output functions. In embodiments, the dataflow interface 1235 includes one or more data signals to transfer input or output data as one or more parallel bits. In embodiments, the dataflow interface 1235 includes one or more enable signals, each indicating when valid data is being presented on a corresponding group of data signals. In embodiments, the dataflow interface 1235 includes one or more flow control signals, each indicating whether or not space is available to receive data in a buffer.

Referring to the accelerator subsystem 1202, the memory interface 1220 provides for access to storage contained in accelerator subsystem 1202, which may include memory and registers, such that a subsystem external to accelerator subsystem 1202 may read and write data to such storage. The memory interface 1220 also provides means for accessing storage external to the accelerator subsystem 1202, which may include one or more memory and registers, such that data may be read or written to such storage under the control of memory interface 1220.

Figure 13:
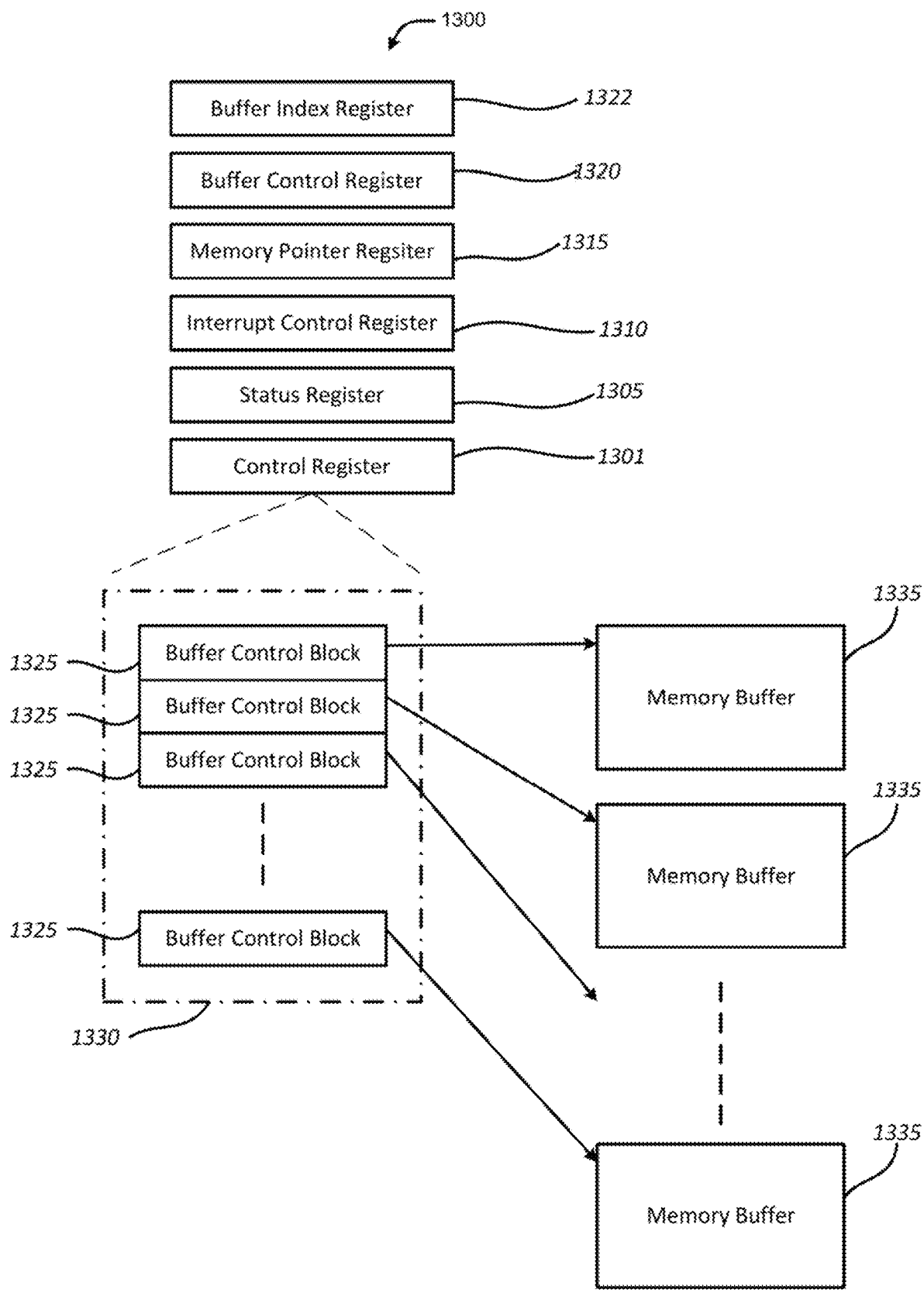
FIG. 13 illustrates example data structures and registers that may be included in the accelerator sub-systems of FIG. 12.

FIG. 13 illustrates example data structures and registers 1300 that may be included in the accelerator sub-system 1201 or 1202 of FIG. 12. Each of the registers 1300 include a group of bits that may be read and/or written by a microprocessor or DSP device (e.g., DSP subsystem 1005 of FIG. 10), and may be mapped to one or more locations in a memory or input-output address space of the microprocessor or DSP device. In embodiments, the group of bits may be implemented as flip-flops or latches. The bits contained within the registers 1300 may be grouped into one or more fields, each containing one or more bits. As shown, the registers include a buffer index register 1322, buffer control register 1320, memory pointer register 1315, interrupt control register 1310, status register 1305, and a control register 1301.

The control register 1301 includes a field/bit to enable operation and a field/bit to abort an in-process operation. The status register 1305 includes one or more fields indicating the current internal state of an accelerator subsystem 1201/1202. The interrupt control register 1310 includes one or more interrupt control fields, the setting of which configures whether an interrupt is to be generated on the occurrence of events within an accelerator subsystem 1201/1202. The events may include the successful completion of a processing step and the occurrence of a processing error.

The memory pointer register 1315 includes one or more fields, the value of each of which determines the address in a memory of a data structure that includes configuration information for the accelerator subsystem 1201/1202. The memory pointer register 1315 also includes a field, the value of which indicates the address in memory of a buffer control block list 1330.

The buffer control register 1320 includes a field that configures a number of buffer control blocks 1325 that are contained within a buffer control block list 1330. The buffer control block list 1330 may be stored in a memory and may contain configuration information for the accelerator subsystem 1201/1202. The buffer index register 1322 includes one or more fields that may indicate the status of one or more buffer control blocks 1325 contained within the buffer control block list 1330. Each buffer control block 1325 may include a field which indicates the address in memory of a corresponding memory buffer 1335.

According to various embodiments, the described fields of one or more registers 1300, 1305, 1310, 1315, 1320 and 1322 may be alternatively arranged in an arbitrary manner with respect to grouping of the described register fields into registers, and ordering of the registers with respect to an address space.

Figure 14:
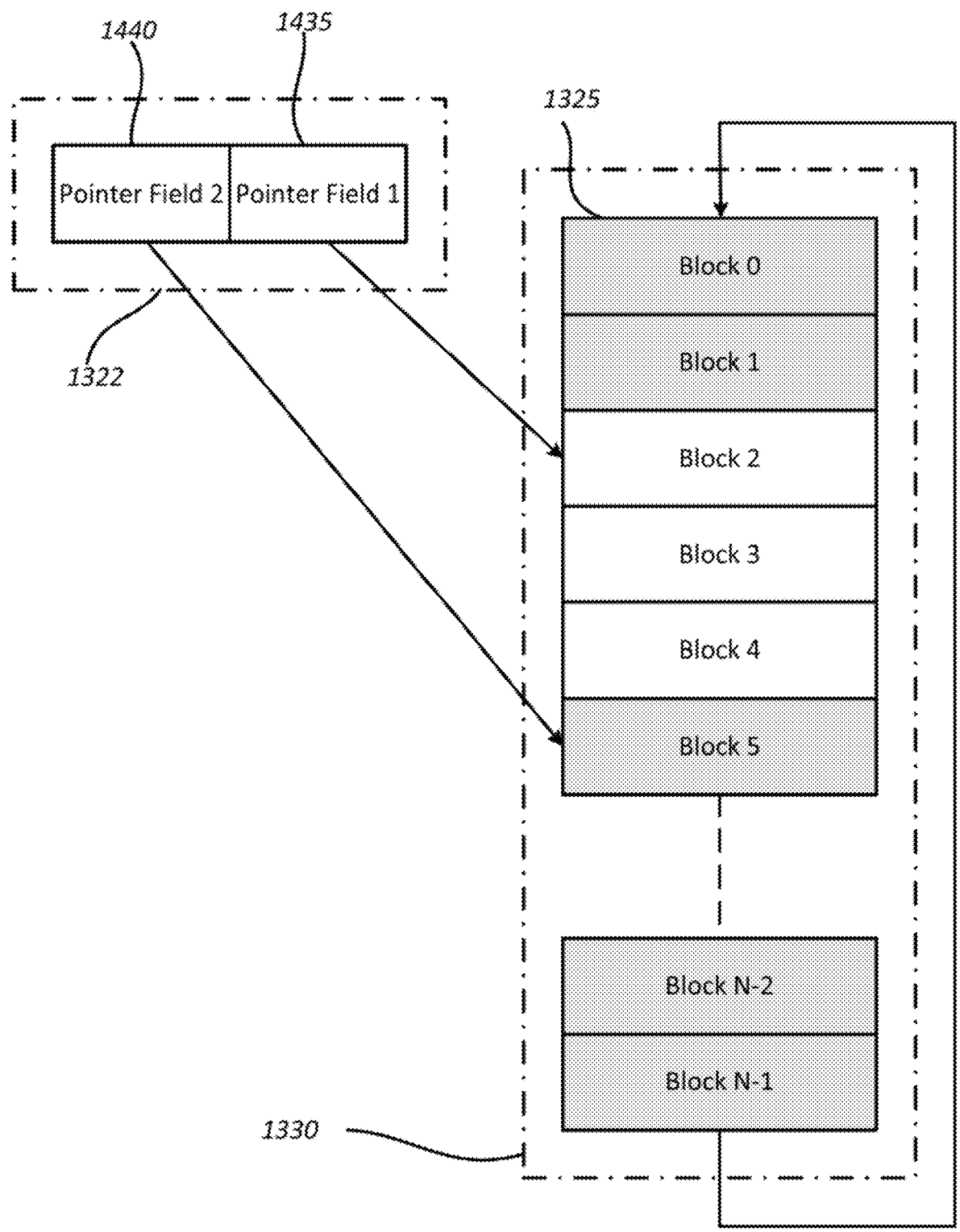
FIG. 14 illustrates operational aspects of the index registers of FIG. 13 and the operation of circular memory buffer control structures, according to various embodiments.

FIG. 14 illustrates operational aspects of the index registers of FIG. 13 and the operation of circular memory buffer control structures, according to various embodiments. Like numbered items in FIG. 14 are the same as described with respect to FIG. 13. In this example, the buffer control block list 1330 includes a number X of buffer control blocks 1325 arranged contiguously in memory, where X is a number. The buffer control blocks 1325 are indexed from 0 to X−1 and form an ordered circular list (e.g., a circular buffer or FIFO buffer) such that buffer control block 1325 indexed k+1 succeeds buffer control block 1325 indexed k, for all values of k such that $0 \leq k \leq N-2$, and buffer control block 1325 indexed 0 succeeds buffer control block 1325 indexed X−1.

According to various embodiments, buffer control block list 1330 is divided into two groups of buffer control blocks 1325. Each group includes a set of contiguously indexed buffer control blocks 1325 according to the described circular indexing scheme. When the accelerator subsystem 1201/1202 is configured to be in a running state, the first group of buffer control blocks 1325 may be considered to be exclusively accessible by a hardware sub-system, and the second group may be considered to be exclusively accessible by software running on an associated processor.

The buffer index register 1322 includes a first pointer field (pointer field 1) 1435, which indicates an index of the first buffer control block 1325 that belongs to a first group. The buffer index register 1322 also includes a second point field (pointer field 2) 1440 that indicates an index of a first buffer control block 1325 that belongs to a second group. In this way, the partitioning of buffer control blocks 1425 into the first group and second group is determined by the values of indices contained in buffer index register 1322. If the pointer field 1 1335 were to be incremented by 1 modulo N, a buffer control block 1425 would be removed from the front of the first group list and moved to the end of the second group list. Similarly, if pointer field 2 1340 were to be incremented by 1 modulo N, a buffer control block 1425 would be removed from the front of the second group list and added to the end of the second group list.

Figure 15:
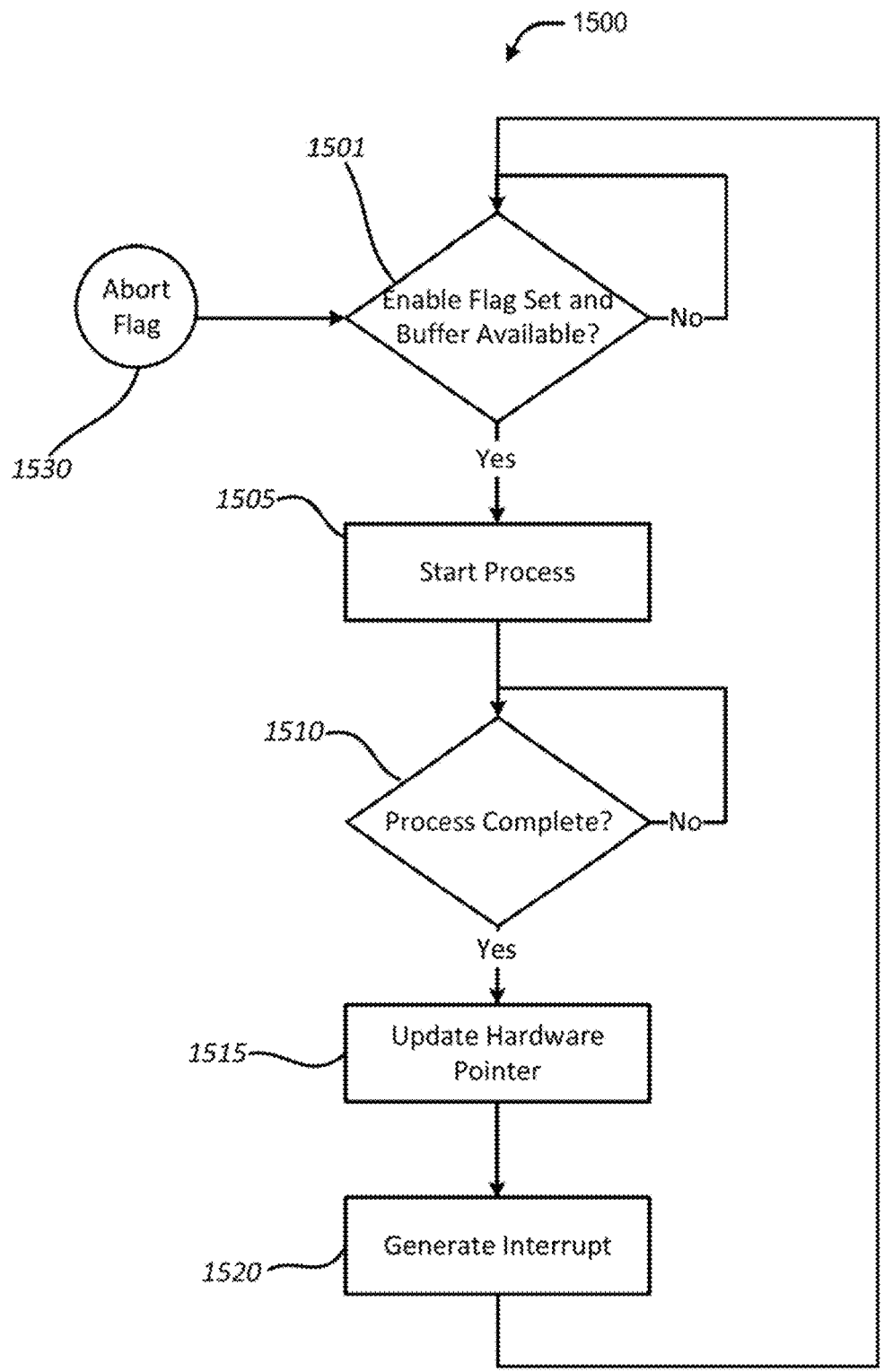
FIG. 15 shows an example procedure that describes some aspects of the operation of the accelerator subsystems of FIG. 12.

FIG. 15 shows an example procedure 1500 that describes some aspects of the operation of the accelerator subsystems 1201/1202 of FIG. 12. The procedure 1500 may be used by the accelerator subsystem 1201/1202 to process a memory buffer, such as the VPFB 100 discussed previously. Moreover, while particular examples and orders of operations are illustrated by FIG. 15, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Procedure 1500 begins at operation 1501 where a state machine (e.g., control state machine 1205 of FIG. 12) to determine whether an enable flag set and a buffer are available. The state machine remains in the decision state 1501 until there is both an enable flag set and an available buffer procedure 1500 to be processed. The buffer may be the VPFB 100 discussed previously.

When an enable flag set and a buffer are available for processing, the state machine transitions to operation 1505 to start processing the buffer. The setting of an abort flag 1530 causes the state machine to transition back to perform the decision of operation 1501. The accelerator subsystem 1201/1202 initiates processing of the memory buffer while in the start process state 1505, and subsequently transitions to operation 1510 to determine whether the process is complete.

The accelerator subsystem 1201/1202 remains in the decision state 1510 while the memory buffer processing is in progress, and transitions to operation 151 to update a hardware pointer when the processing is complete (or subsequent to completion of the memory buffer processing). While in update hardware pointer state 1515, the accelerator subsystem 1201/1202 updates a pointer register to indicate completion of the memory buffer processing, and immediately or subsequently transitions to operation 1520 to generate an interrupt. While in the generate interrupt state 1520, the accelerator subsystem 1201/1202 generates an interrupt that indicates completion of the memory buffer processing. Generation of the interrupt may be enabled or disabled by setting a control 29) register bit as discussed previously. The accelerator subsystem 1201/1202 then transitions from the generate interrupt state 1520 back to operation 1501 to repeat procedure 1500.

Figure 16:
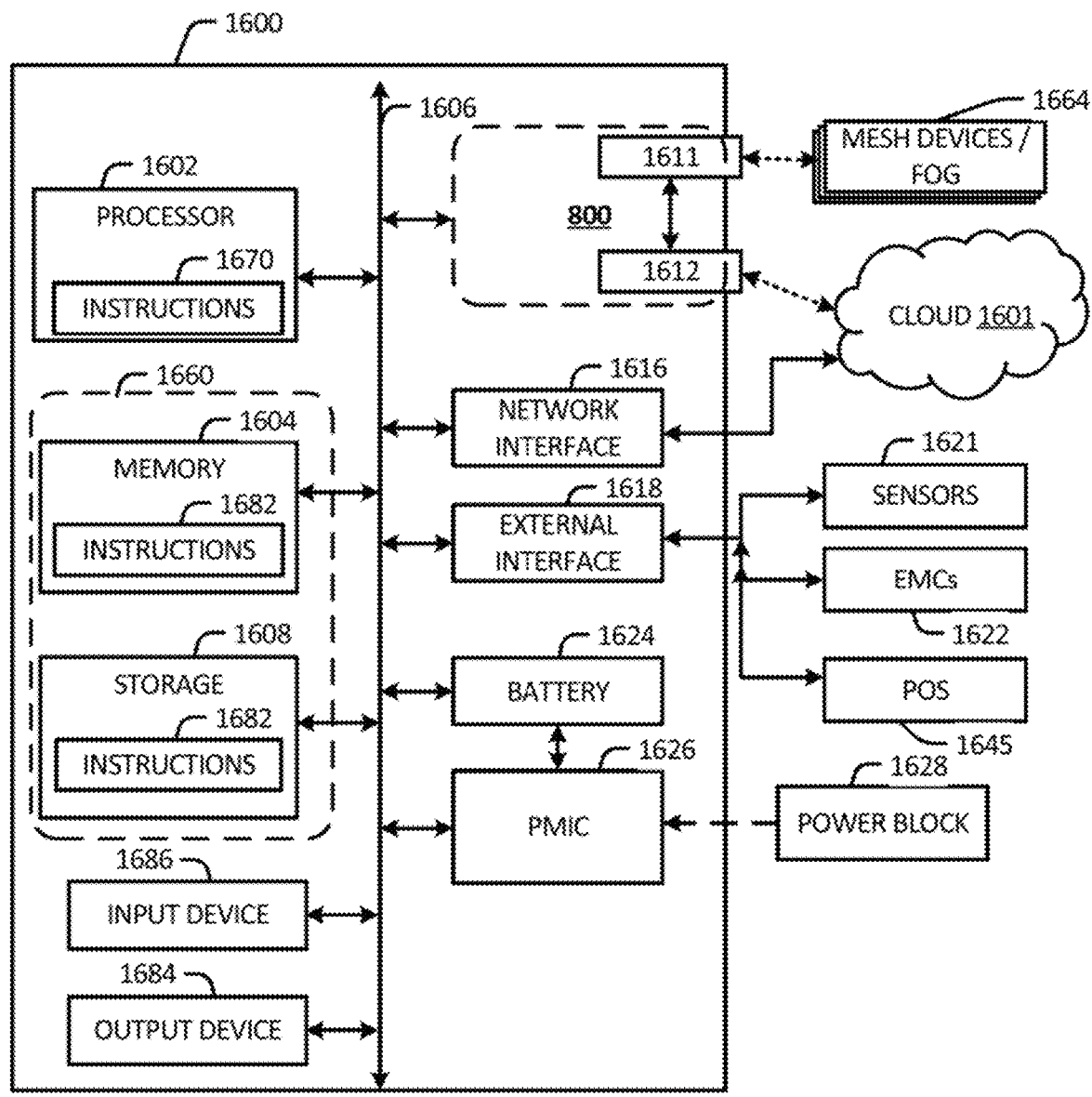
FIG. 16 illustrates an example implementation of a computing platform, in accordance with various embodiments.

FIG. 16 illustrates an example of a platform 1600 (also referred to as "device 1600," "appliance 1600" or the like) in accordance with various embodiments. The platform 1600 may be suitable for use as any of the computer devices discussed herein. Platform 1600 may also be implemented in or as a server computer system or some other element, device, or system discussed herein. The platform 1600 may include any combinations of the components shown in the example. The components of platform 1600 may be implemented as integrated circuits (ICs), portions thereof, discrete electronic devices, or other modules, logic, hardware, software, firmware, or a combination thereof adapted in the computer platform 1600, or as components otherwise incorporated within a chassis of a larger system. The example of FIG. 16 is intended to show a high level view of components of the computer platform 600. However, some of the components shown may be omitted, additional components may be present, and different arrangement of the components shown may occur in other implementations.

The platform 1600 includes processor circuitry 1602. The processor circuitry 1602 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1602 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1602 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1602 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1602 may be coupled with or may include memory/storage and may be configured to execute instructions stored in the memory/storage to enable various applications or operating systems to run on the platform 1600. In some embodiments, the processor circuitry 1602 may be a special-purpose processor/controller to operate according to the various embodiments herein.

As examples, the processor circuitry 1602 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Ryzen processor(s), Accelerated Processing Units (APUs), MxGPUs, Epyc® processor(s), or the like; A5-A9 processor(s) from Apple® Inc., Snapdragon™ processor(s) from Qualcomm Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the processor circuitry 1602 may be a part of a system on a chip (SoC), System-in-Package (SiP), a multi-chip package (MCP), and/or the like, in which the processor circuitry 1602 and other components are formed into a single integrated circuit, or a single package, such as the Edison™ or Galileo™ SoC boards from Intel® Corporation.

Additionally or alternatively, processor circuitry 1602 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1602 may comprise logic blocks or logic fabric including and other interconnected resources that may be programmed to perform various functions, such as the procedures, methods, functions, etc. of the various embodiments discussed herein. In such embodiments, the circuitry of processor circuitry 1602 may include memory cells (e.g., EPROM, EEPROM, lash memory, static memory (e.g., SRAM, anti-fuses, etc.) used to store logic blocks, logic fabric, data, etc. in LUTs and the like.

The processor circuitry 1602 may communicate with system memory circuitry 1604 over an interconnect 1606 (e.g., a bus). Any number of memory devices may be used to provide for a given amount of system memory. As examples, the memory circuitry 1604 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1604 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1604 may also comprise persistent storage devices, which may be temporal and/or persistent storage of any type, including, but not limited to, non-volatile memory, optical, magnetic, and/or solid state mass storage, and so forth.

The individual memory devices of memory circuitry 1604 may be implemented as one or more of solder down packaged integrated circuits, socketed memory modules, and plug-in memory cards. The memory circuitry 1604 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1604. In embodiments, the memory circuitry 920 may be disposed in or on a same die or package as the processor circuitry 1602 (e.g., a same SoC, a same SiP, or soldered on a same MCP as the processor circuitry 1602).

To provide for persistent storage of information such as data, applications, operating systems and so forth, a storage circuitry 1608 may also couple to the processor circuitry 1602 via the interconnect 1606. In an example, the storage circuitry 1608 may be implemented via a solid-state disk drive (SSDD). Other devices that may be used for the storage circuitry 1608 include flash memory cards, such as SD cards, microSD cards, xD picture cards, and the like, and USB flash drives. In low power implementations, the storage circuitry 1608 may be on-die memory or registers associated with the processor circuitry 1602. However, in some examples, the storage circuitry 1608 may be implemented using a micro hard disk drive (HDD). Further, any number of new technologies may be used for the storage circuitry 1608 in addition to, or instead of, the technologies described, such resistance change memories, phase change memories, holographic memories, or chemical memories, among others.

The memory circuitry 1604 and storage circuitry 1608 store instructions 1682 in the form of software, firmware, or hardware commands to implement the techniques described herein. The instructions 1682 may be employed to store working copies and/or permanent copies of programming instructions for the operation of various components of platform 1600 (e.g., drivers, etc.), an operating system of platform 1600, one or more applications, and/or for carrying out the embodiments discussed herein (such as one or more operations of FIGS. 4-5 or 15), collectively referred to as "computational logic" or "modules." The various elements may be implemented by assembler instructions supported by processor circuitry 1602 or high-level languages that may be compiled into such instructions (e.g., instructions 1670). The permanent copy of the programming instructions may be placed into persistent storage devices of storage circuitry 1608 in the factory or in the field through, for example, a distribution medium (not shown), through a communication interface (e.g., from a distribution server (not shown)), or over-the-air (OTA).

Although the instructions 1682 are shown as code blocks included in the memory circuitry 1604 and the storage circuitry 1608, it should be understood that any of the code blocks may be replaced with hardwired circuits, for example, built into an FPGA, ASIC, or some other suitable circuitry. For example, where processor circuitry 1602 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1604 and/or storage circuitry 1608 may store program code of an operating system (OS), which may be a general purpose OS or an OS specifically written for and tailored to the computing platform 1600. The OSs may include one or more drivers that operate to control particular devices that are embedded in the platform 1600, attached to the platform 1600, or otherwise communicatively coupled with the platform 1600. The drivers may include individual drivers allowing other components of the platform 1600 to interact or control various input/output (I/O) devices that may be present within, or connected to, the platform 1600. For example, the drivers may include a display driver to control and allow access to a display device, a touchscreen driver to control and allow access to a touchscreen interface of the platform 1600, sensor drivers to obtain sensor readings of sensor circuitry 1621 and control and allow access to sensor circuitry 1621, EMC drivers to obtain actuator positions of the EMCs 1622 and/or control and allow access to the EMCs 1622, a camera driver to control and allow access to an embedded image capture device, audio drivers to control and allow access to one or more audio devices. The OSs may also include one or more libraries, drivers. APIs, firmware, middleware, software glue, etc., which provide program code and/or software components for one or more applications to obtain and use the data from a secure execution environment (SEE), trusted execution environment (TEE), and/or management engine of the platform 1600 (not shown).

In an example, the instructions 1682/1670 provided via the memory circuitry 1604, the storage circuitry 1608, or the processor circuitry 1602 are embodied as a non-transitory, machine-readable medium 1660 including code to direct the processor circuitry 1602 to perform electronic operations in the platform 1600. The processor circuitry 1602 accesses the non-transitory machine-readable medium 1660 over the interconnect 1606. For instance, the non-transitory, machine-readable medium 1660 may be embodied by devices described for the storage circuitry 1608 of FIG. 16 or may include specific storage units such as optical disks, flash drives, or any number of other hardware devices. The non-transitory, machine-readable medium 1660 may include instructions 1682 to direct the processor circuitry 1602 to perform a specific sequence or flow of actions, for example, as described with respect to the flowchart(s) and block diagram(s) of operations and functionality depicted previously (see e.g., FIGS. 4-5 and 15). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

The computer program code for carrying out operations of the present disclosure (e.g., instructions 1682, 1670, etc.) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), ApexV, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

The components may communicate over the interconnect 1606. The interconnect 1606 may include any number of technologies, including industry standard architecture (ISA), extended ISA (EISA), peripheral component interconnect (PCI), peripheral component interconnect extended (PCIx), PCI express (PCe), or any number of other technologies. The interconnect 1606 may be a proprietary bus, for example, used in a SoC based system. Other bus systems may be included, such as an I$^2$C interface, an SPI interface, point-to-point interfaces, and a power bus, among others.

The interconnect 1606 couples the processor circuitry 1602 to the communication circuitry 800 for communications with other devices. The communication circuitry 800 includes the various components discussed previously with regard to FIGS. 8-15. In various embodiments, communication circuitry 800 interfaces with application circuitry of the platform 1600 (e.g., processor circuitry 1602, memory circuitry 1604, and storage circuitry 1608) for generation and processing of the signals and for controlling operations of the transceivers 1611 and 1612. The transceivers 1611 and 1612 may be the RF circuitry 825 or include various aspects of the RF circuitry 825 discussed previously.

The transceiver 1611 (also referred to as a "mesh transceiver") is used for communications with other mesh or fog devices 1664. The mesh transceiver 1611 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1664. For example, a WLAN unit may be used to implement Wi-Fi™ communications in accordance with the Institute of Electrical and Electronics Engineers (IEEE) 802.11 standard. In addition, wireless wide area communications, for example, according to a cellular or other wireless wide area protocol, may occur via a WWAN unit.

The mesh transceiver 1611 may communicate using multiple standards or radios (e.g., RF circuitry 825) for communications at different ranges. For example, the platform 1600 may communicate with close/proximate devices, e.g., within about 10 meters, using a local transceiver based on BLE, or another low power radio, to save power. More distant mesh devices 1664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1612 (also referred to as a "cloud transceiver" and the like) may be included to communicate with devices or services in the cloud 1601 via local or wide area network protocols. The wireless network transceiver 1612 includes one or more radios (e.g., RF circuitry 825) to communicate with devices in the cloud 1601. The cloud 1601 may be the same or similar to cloud 302 discussed previously. The wireless network transceiver 1612 may be a LPWA transceiver that follows the IEEE 802.15.4, or IEEE 802.15.4g standards, among others, such as those discussed herein. The platform 1600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1611 and wireless network transceiver 1612, as described herein. For example, the radio transceivers 1611 and 1612 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The transceivers 1611 and 1612 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD) High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA). Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12). 3GPP Rel. 13 (3rd Generation Partnership Project Release 13). 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 ((Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE). IEEE 802.15.4 based protocols (e.g., IPv6 over Low power Wireless Personal Area Networks (6LoWPAN), WirelessHART, MiWi, Thread, IS100.11a, etc.) WiFi-direct, ANTANT+, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-GSB (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 1611, 1612 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry/controller (NIC) 1616 may be included to provide wired communication to the cloud 1601 or to other devices, such as the mesh devices 1664 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1600 via NIC 1616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1616 may include one or more dedicated processors and/or FPGAs to communicate using one or more of the aforementioned network interface protocols. In some implementations, the NIC 1616 may include multiple controllers to provide connectivity to other networks using the same or different protocols. For example, the platform 1600 may include a first NIC 1616 providing communications to the cloud over Ethernet and a second NIC 1616 providing communications to other devices over another type of network.

The interconnect 1606 may couple the processor circuitry 1602 to an external interface 1618 (also referred to as "I/O interface circuitry" or the like) that is used to connect external devices or subsystems. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. The external devices include, inter alia, sensor circuitry 1621, EMCs 1622, and positioning circuitry 1645.

The sensor circuitry 1621 may include devices, modules, or subsystems whose purpose is to detect events or changes in its environment and send the information (sensor data) about the detected events to some other a device, module, subsystem, etc. Examples of such sensors 1621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1618 connects the platform 1600 to electro-mechanical devices (EMCs) 1624, allow platform 1600 to change its state, position, and/or orientation, or move or control a mechanism or system. The EMCs 1622 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1600 may be configured to operate one or more EMCs 1622 based on one or more captured events and/or instructions or control signals received from a service provider and/or various client systems. In some embodiments, the sensor circuitry 1621 and EMCs 1622 may correspond to the sensors 2028 discussed with regard to FIG. 20.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the communication circuitry 800 to communicate with the nodes and components of the positioning network. The positioning circuitry 1645 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 1600, which are referred to as input device circuitry 1686 and output device circuitry 1684 in FIG. 16. The input device circuitry 1686 and output device circuitry 1684 include one or more user interfaces designed to enable user interaction with the platform 1600 and/or peripheral component interfaces designed to enable peripheral component interaction with the platform 1600. Input device circuitry 886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1684 may be included to show information or otherwise convey information, such as sensor readings, actuator position(s), or other like information. Output device circuitry 1684 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chyrstal Displays (LCD), LED displays, quantum dot displays, projectors, etc.), with the output of characters, graphics, multimedia objects, and the like being generated or produced from the operation of the platform 1600. The output device circuitry 1684 may also include speakers or other audio emitting devices, printer(s), and/or the like. In some embodiments, the sensor circuitry 1621 may be used as the input device circuitry 1686 (e.g., an image capture device, motion capture device, or the like) and one or more EMCs 1622 may be used as the output device circuitry 1684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1624 may be coupled to the platform 200 to power the platform 1600, which may be used in embodiments where the platform 1600 is not in a fixed location. The battery 1624 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1600 is mounted in a fixed location, the platform 1600 may have a power supply coupled to an electrical grid. In these embodiments, the platform 1600 may include power tee circuitry to provide for electrical power drawn from a network cable to provide both power supply and data connectivity to the platform 1600 using a single cable.

Power management integrated circuitry (PMIC) 1626 may be included in the platform 160 to track the state of charge (SoCh) of the battery 1624, and to control charging of the platform 1600. The PMIC 1626 may be used to monitor other parameters of the battery 1624 to provide failure predictions, such as the state of health (SoH) and the state of function (SoF) of the battery 1624. The PMIC 1626 may include voltage regulators, surge protectors, power alarm detection circuitry. The power alarm detection circuitry may detect one or more of brown out (under-voltage) and surge (over-voltage) conditions. The PMIC 1626 may communicate the information on the battery 1624 to the processor circuitry 1602 over the interconnect 1606. The PMIC 1626 may also include an analog-to-digital (ADC) convertor that allows the processor circuitry 1602 to directly monitor the voltage of the battery 1624 or the current flow from the battery 1624. The battery parameters may be used to determine actions that the platform 1600 may perform, such as transmission frequency, mesh network operation, sensing frequency, and the like. As an example, the PMIC 1626 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 1628, or other power supply coupled to a grid, may be coupled with the PMIC 1626 to charge the battery 1624. In some examples, the power block 1628 may be replaced with a wireless power receiver to obtain the power wirelessly, for example, through a loop antenna in the platform 1600. A wireless battery charging circuit, such as an LTC4020 chip from Linear Technologies of Milpitas, Calif., among others, may be included in the PMIC 1626. The specific charging circuits chosen depend on the size of the battery 1624, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

III. Example System Overview

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 17:
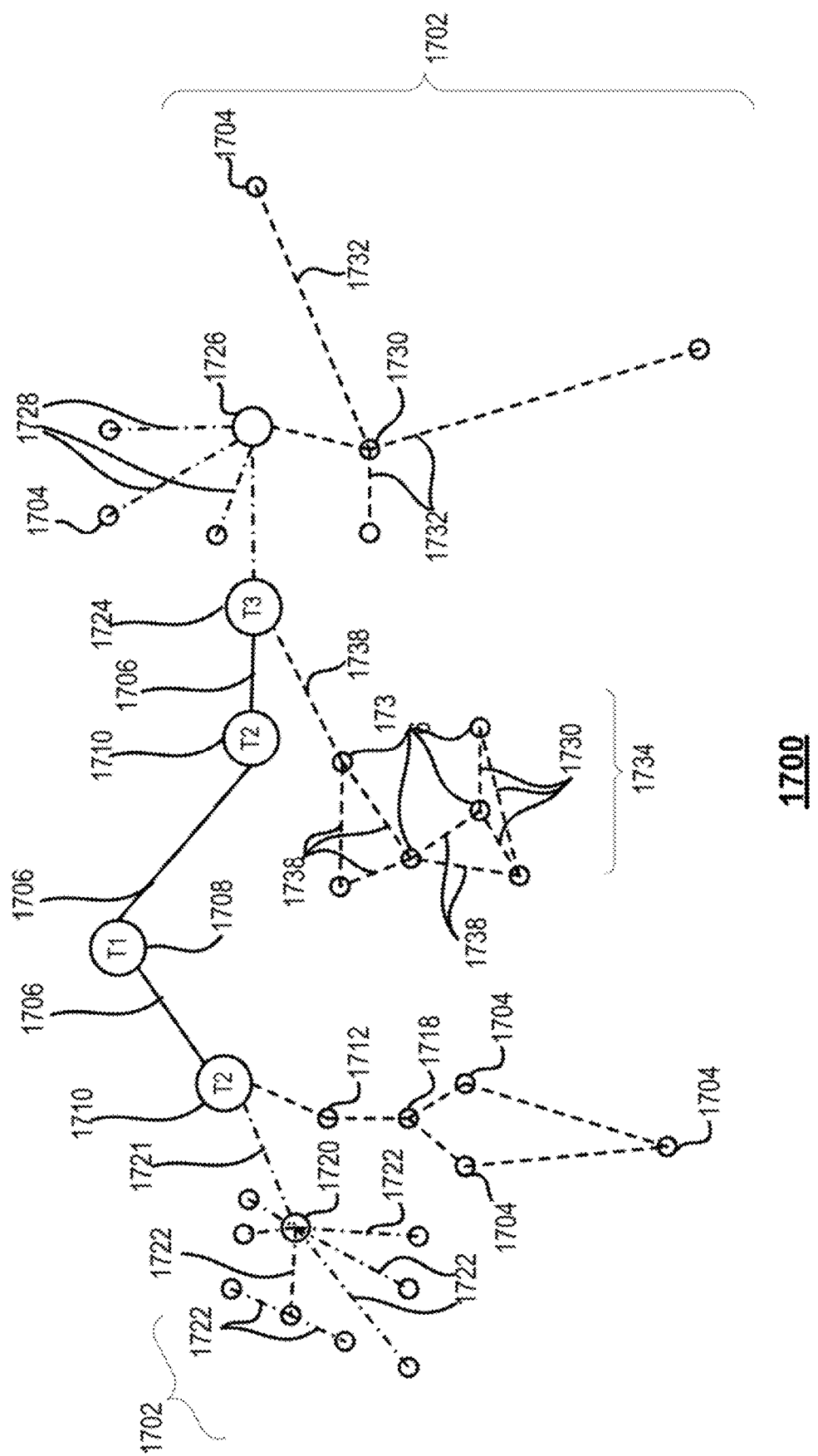
FIG. 17 illustrates an arrangement showing interconnections that may be present between a network and Internet of Things (IoT) networks, in accordance with various embodiments.

FIG. 17 illustrates an arrangement 1700 showing interconnections that may be present between the Internet and IoT networks, in accordance with various embodiments. The interconnections may couple smaller networks 1702, down to the individual IoT device 1704, to the fiber backbone 1706 of the Internet 100. To simplify the drawing, not every device 1704, or other object, is labeled.

In FIG. 1, top-level providers, which may be termed tier 1 providers 1708, are coupled by the fiber backbone of the Internet to other providers, such as secondary or tier 2 providers 1710. In one example, a tier 2 provider 1710 may couple to a tower 1712 of an LTE cellular network, for example, by further fiber links, by microwave communications 1714, or by other communications technologies. The tower 1712 may couple to a mesh network including IoT devices 1704 through an LTE communication link 116, for example, through a central node 118. The communications between the individual IoT devices 1704 may also be based on LTE or NR communication links 1716. In another example, a high-speed uplink 120 may couple a tier 2 provider 1710 to a gateway (GW) 1720. A number of IoT devices 1704 may communicate with the GW 1720, and with each other through the GW 1720, for example, over BLE links 1722.

The fiber backbone 1706 may couple lower levels of service providers to the Internet, such as tier 3 providers 124. A tier 3 provider 1724 may be considered a general Internet service provider (ISP), for example, purchasing access to the fiber backbone 1710 from a tier 2 provider 1710 and providing access to a corporate GW 1726 and other customers. From the corporate GW 1726, a wireless local area network (WLAN) can be used to communicate with IoT devices 1704 through Wi-Fi® links 1728. A Wi-Fi link 128 may also be used to couple to a low power wide area (LPWA) GW 1730, which can communicate with IoT devices 1704 over LPWA links 1732, for example, compatible with the LORaWan specification promulgated by the LoRa alliance.

The tier 3 provider 1724 may also provide access to a mesh network 1734 through a coordinator device 1736 that communicates with the tier 3 provider 1724 using any number of communications links, such as an LTE cellular link, an LPWA link, or a link 1738 based on the IEEE 802.15.4 standard, such as Zigbee®. Other coordinator devices 1736 may provide a chain of links that forms cluster tree of linked devices.

IoT devices 1704 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 1704 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 1704 may be biotic devices such as monitoring implants, biosensors, biochips, and the like. In other embodiments, an IoT device 1704 may be a computer device that is embedded in a computer system and coupled with communications circuitry of the computer system. In such embodiments, the IoT device 1704 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like. As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

Each of the IoT devices 1704 may include one or more memory devices and one or more processors to capture and store/record data. Each of the IoT devices 1704 may include appropriate communications circuitry (e.g., transceiver(s), modem, antenna elements, etc.) to communicate (e.g., transmit and receive) captured and stored/recorded data. Further, each IoT device 1704 may include other transceivers for communications using additional protocols and frequencies. The wireless communications protocols may be any suitable set of standardized rules or instructions implemented by the IoT devices 1704 to communicate with other devices, including instructions for packetizing/depacketizing data, instructions for modulating/demodulating signals, instructions for implementation of protocols stacks, and the like. For example, IoT devices 1704 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 1712, GW 1720, 1726, and 1730, coordinator device 136, and so forth, may also be incorporated with the embodiments described herein, in particular, with references to FIGS. 5-11.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 18:
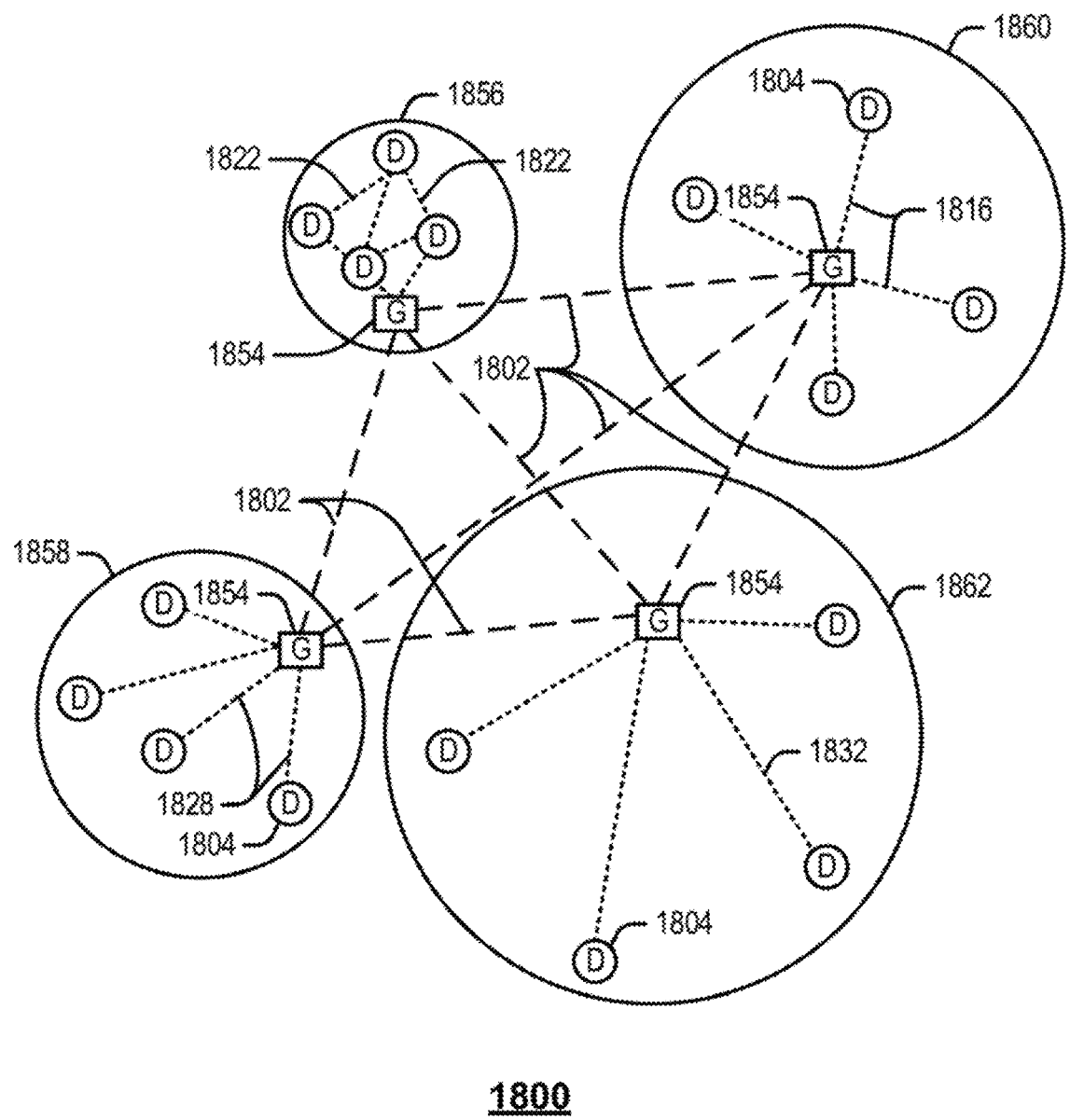
FIG. 18 illustrates an example domain topology, in accordance with various embodiments.

FIG. 18 illustrates an example domain topology 1800 that may be used for a number of IoT networks coupled through backbone links 1802 to GWs 1804, in accordance with various embodiments. Like numbered items are as described with respect to FIG. 17. Further, to simplify the drawing, not every device 1804, or communications link 1716, 1722, 1728, or 1732 is labeled. The backbone links 1802 may include any number of wired or wireless technologies, and may be part of a local area network (LAN), a wide area network (WAN), or the Internet. Similar to FIG. 17, in embodiments, one or more of IoT devices 1804/1704, GWs 1804, and so forth, may be incorporated with embodiments described herein.

The network topology 1800 may include any number of types of IoT networks, such as a mesh network 1806 using BLE links 1722. Other IoT networks that may be present include a WLAN network 1808, a cellular network 1810, and an LPWA network 1812. Each of these IoT networks may provide opportunities for new developments, as described herein. For example, communications between IoT devices 1704, such as over the backbone links 1802, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1806 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1808 may use systems that perform standards conversion to provide multi-standard connectivity, enabling IoT devices 1704 using different protocols to communicate. Further systems may provide seamless interconnectivity across a multi-standard infrastructure comprising visible Internet resources and hidden Internet resources. Communications in the cellular network 1810 may be enhanced by systems that offload data, extend communications to more remote devices, or both. The LPWA network 1812 may include systems that perform non-Internet protocol (IP) to IP interconnections, addressing, and routing.

Figure 19:
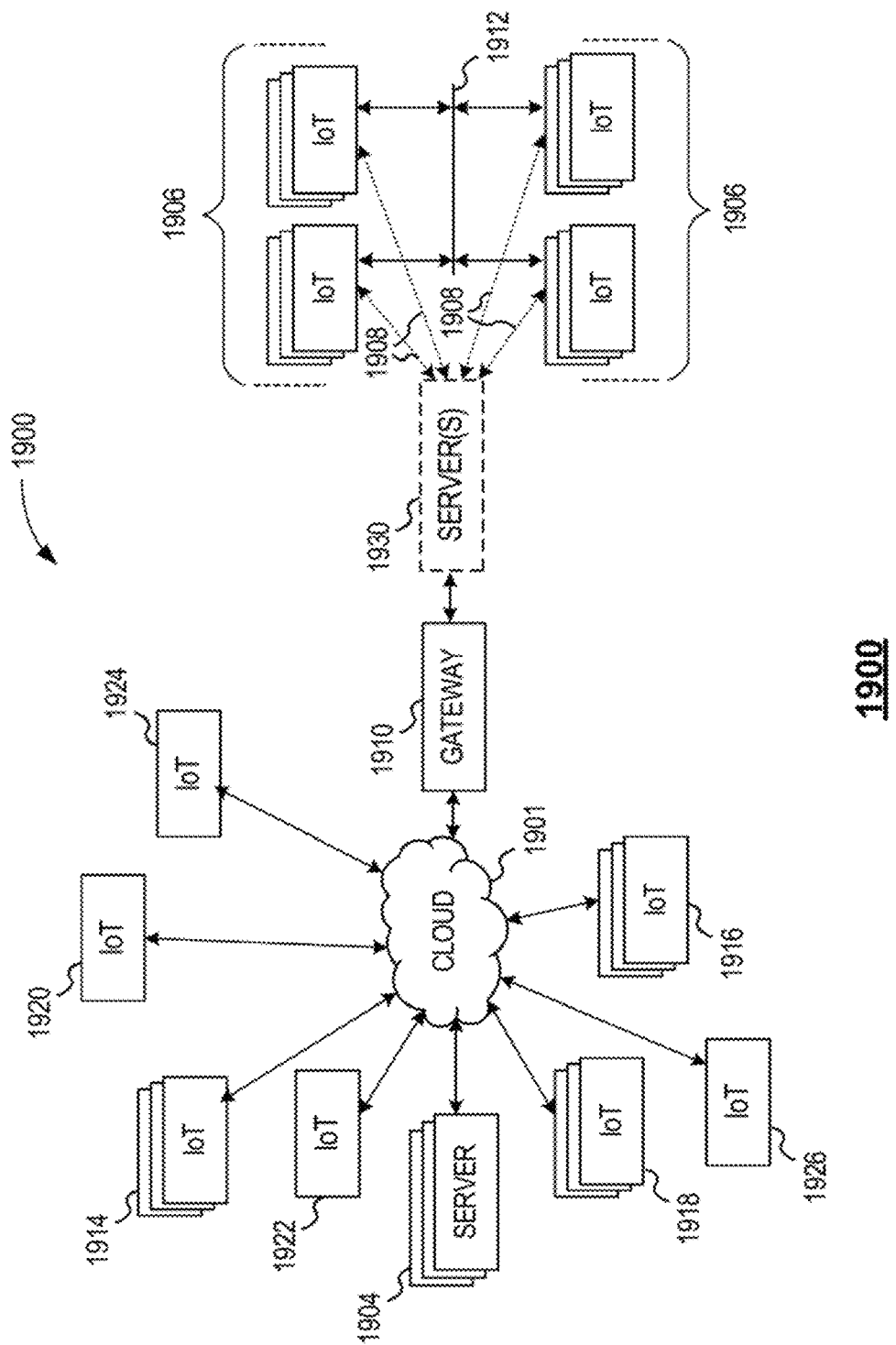
FIG. 19 illustrates an example cloud computing network or cloud in communication with a number of IoT devices, in accordance with various embodiments.

FIG. 19 illustrates an arrangement 1900 of example cloud computing network, or cloud 1901, in communication with a number of Internet of Things (IoT) devices, in accordance with various embodiments. The cloud 1901 may represent the Internet, one or more cellular networks, a local area network (LAN) or a wide area network (WAN) including proprietary and/or enterprise networks for a company or organization, or combinations thereof. Cloud 1901 may correspond to cloud 1601 of FIG. 16. Components used for such communications system can depend at least in part upon the type of network and/or environment selected. Protocols and components for communicating via such networks are well known and will not be discussed herein in detail. However, it should be appreciated that cloud 1901 may be associated with network operator who owns or controls equipment and other elements necessary to provide network-related services, such as one or more base stations or access points, and one or more servers for routing digital data or telephone calls (for example, a core network or backbone network).

The IoT devices in FIG. 19 may be the same or similar to the IoT devices 1704 discussed with regard to FIGS. 17-18. The IoT devices may include any number of different types of devices, grouped in various combinations, such as IoT group 1906 that may include IoT devices that provide one or more services for a particular user, customer, organizations, etc. A service provider may deploy the IoT devices in the IoT group 1906 to a particular area (e.g., a geolocation, building, etc.) in order to provide the one or more services. In one example, the IoT group 306 may be a traffic control group where the IoT devices in the IoT group 1906 may include stoplights, traffic flow monitors, cameras, weather sensors, and the like, to provide traffic control and traffic analytics services for a particular municipality or other like entity. Similar to FIGS. 17-18, in embodiments, one or more of IoT devices 1914-1924, GW 1910, and so forth, may be incorporated with the various embodiments described herein, in particular, with references to FIGS. 1-16. For example, in some embodiments, the IoT group 1906, or any of the IoT groups discussed herein, may include the components, devices, systems discussed with regard to FIGS. 1-16.

The IoT group 1906, or other subgroups, may be in communication with the cloud 1901 through wireless links 1908, such as LPWA links, and the like. Further, a wired or wireless sub-network 1912 may allow the IoT devices to communicate with each other, such as through a local area network, a wireless local area network, and the like. The IoT devices may use another device, such as a GW 1910 to communicate with the cloud 1901. Other groups of IoT devices may include remote weather stations 1914, local information terminals 1916, alarm systems 1918, automated teller machines 1920, alarm panels 1922, or moving vehicles, such as emergency vehicles 1924 or other vehicles 1926, among many others. Each of these IoT devices may be in communication with other IoT devices, with servers 1904, or both.

As can be seen from FIG. 19, a large number of IoT devices may be communicating through the cloud 1901. This may allow different IoT devices to request or provide information to other devices autonomously. For example, the IoT group 106 may request a current weather forecast from a group of remote weather stations 1914, which may provide the forecast without human intervention. Further, an emergency vehicle 1924 may be alerted by an automated teller machine 1920 that a burglary is in progress. As the emergency vehicle 1924 proceeds towards the automated teller machine 1920, it may access the traffic control group 1906 to request clearance to the location, for example, by lights turning red to block cross traffic at an intersection in sufficient time for the emergency vehicle 1924 to have unimpeded access to the intersection.

In another example, the for group 1906 may be an industrial control group (also referred to as a "connected factory", an "industry 4.0" group, and the like) where the IoT devices in the IoT group 1906 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1906 may communicate with the servers 1904 via GW 1910 and cloud 1901 to provide captured data, which may be used to provide performance monitoring and analytics to the manufacturer or factory operator. Additionally, the IoT devices in the IoT group 1906 may communicate among each other, and/or with other IoT devices of other IoT groups, to make decisions on their own and to perform their tasks as autonomously as possible.

Clusters of IoT devices, such as the IoT groups depicted by FIG. 19, may be equipped to communicate with other IoT devices as well as with the cloud 1901. This may allow the IoT devices to form an ad-hoc network between the devices, allowing them to function as a single device, which may be termed a fog device. This is discussed further with respect to FIG. 20.

Figure 20:
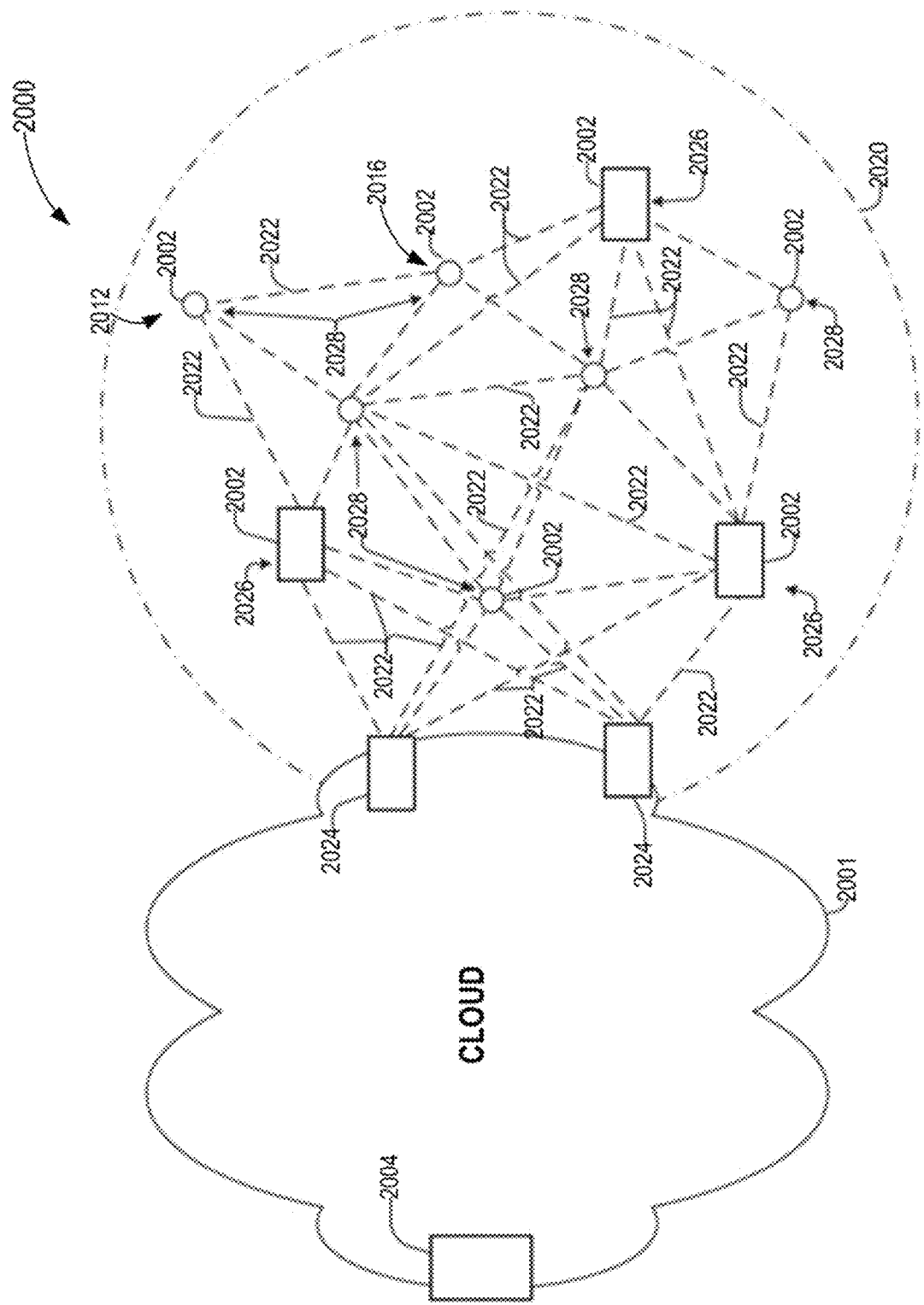
FIG. 20 illustrates an arrangement of a cloud computing network or cloud in communication with a mesh network of IoT devices or IoT fog, in accordance with various embodiments.

FIG. 20 illustrates an arrangement 2000 of a cloud computing network, or cloud 2001, in communication with a mesh network of IoT devices, which may be termed a fog device 2020 or fog 2020, operating at the edge of the cloud 2001, in accordance with various embodiments. Cloud 2001 may be the same or similar to cloud 1601 of FIG. 16 and cloud 1901 of FIG. 19. Like numbered items are as described with respect to FIGS. 17-19. In this example, the fog 2020 is a group of IoT devices at an intersection. The fog 2020 may be established in accordance with specifications released by the OpenFog Consortium (OFC), the Open Connectivity Foundation™ (OCF), among others.

In embodiments, fog computing systems, such as fog 2020, may be mechanisms for bringing cloud computing functionality closer to data generators and consumers wherein various network devices run cloud application logic on their native architecture. Fog computing systems may be used to perform low-latency computation/aggregation on the data while routing it to a central cloud computing service for performing heavy computations or computationally burdensome tasks. On the other hand, edge cloud computing consolidates human-operated, voluntary resources such as desktop PCs, tablets, smartphones, nano data centers as a cloud. In various implementations, resources in the edge cloud may be in one to two-hop proximity to the IoT devices 2004, which may result in reducing overhead related to processing data and may reduce network delay.

In some embodiments, the fog 2020 may be a consolidation of IoT devices 2004 and/or networking devices, such as routers and switches, with high computing capabilities and the ability to run cloud application logic on their native architecture. Fog resources may be manufactured, managed, and deployed by cloud vendors, and may be interconnected with highspeed, reliable links. Moreover, Fog resources reside farther from the edge of the network when compared to edge systems but closer than a central cloud infrastructure. Fog devices are used to effectively handle computationally intensive tasks offloaded by edge resources.

In embodiments, the fog 2020 may operate at the edge of the cloud 2001. In some embodiments, the fog 2020 operating at the edge of the cloud 2001 may overlap or be subsumed into an edge network of the cloud 2001. In embodiments, the edge network of the cloud 2001 may overlap with the fog 2020, or become a part of the fog 2020. Furthermore, the fog 2020 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as those discussed herein.

Data may be captured, stored/recorded, and communicated among the IoT devices 2004. Analysis of the traffic flow and control schemes may be implemented by aggregators 2026 that are in communication with the IoT devices 2004 and each other through a mesh network. Data may be uploaded to the cloud 2001, and commands received from the cloud 2001, through GWs 310 that are in communication with the IoT devices 2004 and the aggregators 2006 through the mesh network. Unlike the traditional cloud computing model, in some implementations, the cloud 2001 may have little or no computational capabilities and only serves as a repository for archiving data recorded and processed by the fog 2020. In these implementations, the cloud 2001 centralized data storage system and provides reliability and access to data by the computing resources in the fog 2020 and/or edge devices. Being at the core of the architecture, the Data Store is accessible by both Edge and Fog layers of the aforementioned edge-fog network.

Similar to FIGS. 17-19, in embodiments, one or more of IoT devices 2004, aggregators 2026, and so forth, may be incorporated with the various embodiments described herein, in particular, with references to FIGS. 1-16. For example, in some embodiments, the fog 2020, or any of grouping of devices discussed herein, may include the one or more components, devices systems, etc. discussed infra with regard to FIGS. 8-16.

Any number of communications links may be used in the fog 2020. Shorter-range links 2008, for example, compatible with IEEE 802.15.4 may provide local communications between IoT devices that are proximate to one another or other devices. Longer-range links 2010, for example, compatible with LPWA standards, may provide communications between the IoT devices and the GWs 2010. To simplify the diagram, not every communications link 2008 or 2010 is labeled with a reference number.

The fog 2020 may be considered to be a massively interconnected network wherein a number of IoT devices are in communications with each other, for example, by the communication links 2008 and 2010. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 310. In these networks, the number of interconnections may provide substantial redundancy, allowing communications to be maintained, even with the loss of a number of IoT devices.

Not all of the IoT devices may be permanent members of the fog 2020. In the example of FIG. 20, three transient IoT devices have joined the fog 2020, a first mobile device 2012, a second mobile device 2014, and a third mobile device 2016. The fog 2020 may be presented to clients in the cloud 2001, such as the server 2004, as a single device located at the edge of the cloud 2001. In this example, the control communications to specific resources in the fog 2020 may occur without identifying any specific IoT device 2004 within the fog 2020. Accordingly, if any IoT device 2004 fails, other IoT devices 2004 may be able to discover and control a resource. For example, the IoT devices 2004 may be wired so as to allow any one of the IoT devices 2004 to control measurements, inputs, outputs, etc., for the other IoT devices 2004. The aggregators 2026 may also provide redundancy in the control of the IoT devices 2004 and other functions of the fog 2020.

In some examples, the IoT devices may be configured using an imperative programming style, e.g., with each IoT device having a specific function and communication partners. However, the IoT devices forming the fog 2020 may be configured in a declarative programming style, allowing the IoT devices to reconfigure their operations and communications, such as to determine needed resources in response to conditions, queries, and device failures. This may be performed as transient IoT devices, such as the devices 2012, 2014, 2016, join the fog 2020. As transient or mobile IoT devices enter or leave the fog 2002, the fog 2020 may reconfigure itself to include those devices. This may be performed by forming a temporary group of the devices 2012 and 2014 and the third mobile device 2016 to control or otherwise communicate with the IoT devices 2004. If one or both of the devices 2012, 2014 are autonomous, the temporary group may provide instructions to the devices 2012, 2014. As the transient devices 2012, 2014, and 2016, leave the vicinity of the fog 2020, it may reconfigure itself to eliminate those IoT devices from the network. The fog 2020 may also divide itself into functional units, such as the IoT devices 2004 and other IoT devices proximate to a particular area or geographic feature, or other IoT devices that perform a particular function. This type of combination may enable the formation of larger IoT constructs using resources from the fog 2020.

As illustrated by the fog 2020, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data, and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier." and/or any other like term denoting a pathway or medium through which data is communicated. Additionally, the term "link" may refer to a connection between two devices for the purpose of transmitting and receiving information As used herein, the term "computer system" refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "appliance," "computer appliance," or the like, refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated o provide a specific computing resource.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Some non-limiting example as provided infra. The following examples pertain to further embodiments. Specifics in the examples may be used anywhere in one or more embodiments. All optional features of the apparatus(es) described herein may also be implemented with respect to a method or process.

Example 1 includes an integrated circuit (IC) comprising: memory circuitry to be implemented as a first in first out (FIFO) buffer; and a controller communicatively coupled with the memory circuitry, the controller to control storage of received data in the FIFO buffer, and change a size of the received data to be stored in the FIFO buffer based on a current amount of data stored in the FIFO buffer or an amount of currently free space available in the FIFO buffer.

Example 2 includes the IC of example 1 and/or some other examples herein, wherein the controller is to determine whether to change the size of the data to be stored in the FIFO buffer in response to receipt of a piece of data to be stored in the FIFO buffer.

Example 3 includes the IC of examples 1-2 and/or some other examples herein, wherein the controller is to: discard a new piece of data to be stored in the FIFO buffer when the current amount of data stored in the FIFO buffer is in excess of a size threshold of the FIFO buffer.

Example 4 includes the IC of examples 1-2 and/or some other examples herein, wherein the controller is to: discard a new piece of data to be stored in the FIFO buffer when the amount of currently free space is less than a free space threshold amount of the FIFO buffer.

Example 5 includes the IC of examples 14 and/or some other examples herein, wherein, to change the size of the data to be stored in the FIFO buffer, the controller is to: control storage of an entirety of a new piece of data in the FIFO buffer when the current amount of data stored in the FIFO buffer is less than a first threshold; or control storage of an entirety of a new piece of data in the FIFO buffer when the amount of currently free space in the FIFO buffer is greater than another first threshold.

Example 6 includes the IC of example 5 and/or some other examples herein, wherein, to change the size of the data to be stored in the FIFO buffer, the controller is to: control storage of a first portion of the new piece of data in the FIFO buffer when the current amount of data stored in the FIFO buffer is greater than or equal to the first threshold and less than a second threshold; or control storage of the first portion of the new piece of data in the FIFO buffer when the amount of currently free space in the FIFO buffer is less than or equal to the other first threshold and greater than another second threshold.

Example 7 includes the IC of example 6 and/or some other examples herein, wherein a size of the second portion is less than a size of the first portion, and to change the size of the data to be stored in the FIFO buffer, the controller is to: control storage of a second portion of the new piece of data in the FIFO buffer when the current amount of data stored in the FIFO buffer is greater than or equal to the second threshold and less than a size threshold of the FIFO buffer; or control storage of a second portion of the new piece of data in the FIFO buffer when the amount of currently free space in the FIFO buffer is less than or equal to the other second threshold and greater than a free space threshold amount of the FIFO buffer.

Example 8 includes the IC of example 7 and/or some other examples herein, wherein the piece of data is a word comprising a number of bits N, the size of the first portion is N/2, and the size of the second portion is N/4.

Example 9 includes the IC of example 8 and/or some other examples herein, wherein N represents a quantization precision of an analog signal.

Example 10 includes the IC of examples 7-9 and/or some other examples herein, wherein the first threshold is 50% of the size threshold of the FIFO buffer, and the second threshold is 75% of the size threshold of the FIFO buffer.

Example 11 includes the IC of examples 1-10 and/or some other examples herein, wherein the IC is a field-programmable gate array (FPGA).

Example 12 includes the IC of examples 1-10 and/or some other examples herein, wherein the IC is a baseband processor, and wherein the memory circuitry is an in-package memory device of the baseband processor.

Example 13 includes one or more computer-readable media (CRM) comprising instructions, wherein execution of the instructions by one or more processors of baseband circuitry is to cause the baseband circuitry to: obtain a quantized data sample to be stored in a first in first out (FIFO) buffer; select a number of bits of the quantized data sample to be stored in the FIFO buffer based on a current amount of data stored in the FIFO buffer or an amount of currently free space available in the FIFO buffer; and control storage of the selected number of bits in the FIFO buffer.

Example 14 includes the one or more CRM of example 13 and/or some other examples herein, wherein execution of the instructions is to cause the baseband circuitry to: determine whether to select the number of bits to be stored in the FIFO buffer in response to receipt of the quantized data sample.

Example 15 includes the one or more CRM of examples 13-14 and/or some other examples herein, wherein execution of the instructions is to cause the baseband circuitry to: select all bits of the quantized data sample to be stored in the FIFO buffer when the current amount of data stored in the FIFO buffer is less than a first threshold; select half of the number of bits of the quantized data sample to be stored in the FIFO buffer when the current amount of data stored in the FIFO buffer is greater than or equal to the first threshold and less than a second threshold; select a quarter of the number of bits of the quantized data sample to be stored in the FIFO buffer when the current amount of data stored in the FIFO buffer is greater than the second threshold and less than a size threshold of the FIFO buffer; and discard the quantized data sample when the current amount of data stored in the FIFO buffer is in excess of the size threshold of the FIFO buffer.

Example 16 includes the one or more CRM of examples 13-14 and/or some other examples herein, wherein execution of the instructions is to cause the baseband circuitry to: select all bits of the quantized data sample to be stored in the FIFO buffer when the amount of currently free space in the FIFO buffer is greater than a first threshold; select half of the number of bits of the quantized data sample to be stored in the FIFO buffer when the amount of currently free space in the FIFO buffer is less than or equal to the first threshold and greater than a second threshold; select a quarter of the number of bits of the quantized data sample to be stored in the FIFO buffer when the amount of currently free space in the FIFO buffer is less than or equal to the second threshold and greater than a free space threshold amount of the FIFO buffer; and discard the quantized data sample when the amount of currently free space is less than or equal to the free space threshold amount of the FIFO buffer.

Example 17 includes the one or more CRM of examples 15-16 and/or some other examples herein, wherein the quantized data sample represents a sample of an analog signal, and the number of bits represents a quantization precision of the analog signal.

Example 18 includes the one or more CRM of examples 15-16 and/or some other examples herein, wherein the FIFO buffer is implemented in an in-package memory device of the baseband processor.

Example 19 includes communication circuitry comprising: radiofrequency (RF) circuitry coupled to an antenna array; and baseband circuitry communicatively coupled with the RF circuitry, wherein the baseband circuitry is configured to: obtain a quantized data sample; determine a current amount of data stored in first out (FIFO) buffer or an amount of currently free space available in the FIFO buffer; select a number of bits of the quantized data sample to be stored in the FIFO buffer based on the current amount of data stored in the FIFO buffer or the amount of currently free space in the FIFO buffer; and store the selected number of bits in the FIFO buffer.

Example 20 includes the communication circuitry of example 19 and/or some other examples herein, wherein the baseband circuitry is configured to: determine whether to select the number of bits to be stored in the FIFO buffer in response to receipt of the quantized data sample from the RF circuitry.

Example 21 includes the communication circuitry of examples 19-20 and/or some other examples herein, wherein the baseband circuitry is configured to: select all bits of the quantized data sample to be stored in the FIFO buffer when the current amount of data stored in the FIFO buffer is less than a first threshold; select half of the number of bits of the quantized data sample to be stored in the FIFO buffer when the current amount of data stored in the FIFO buffer is greater than or equal to the first threshold and less than a second threshold; select a quarter of the number of bits of the quantized data sample to be stored in the FIFO buffer when the current amount of data stored in the FIFO buffer is greater than or equal to the second threshold and less than a size threshold of the FIFO buffer; and discard the quantized data sample when the current amount of data stored in the FIFO buffer is in excess of the size threshold of the FIFO buffer.

Example 22 includes the communication circuitry of examples 19-20 and/or some other examples herein, wherein the baseband circuitry is configured to: select all bits of the quantized data sample to be stored in the FIFO buffer when the amount of currently free space in the FIFO buffer is greater than a first threshold; select half of the number of bits of the quantized data sample to be stored in the FIFO buffer when the amount of currently free space in the FIFO buffer is less than or equal to the first threshold and greater than a second threshold; select a quarter of the number of bits of the quantized data sample to be stored in the FIFO buffer when the amount of currently free space in the FIFO buffer is less than or equal to the second threshold and greater than a free space threshold amount of the FIFO buffer; and discard the quantized data sample when the amount of currently free space is less than or equal to the free space threshold amount of the FIFO buffer.

Example 23 includes the communication circuitry of examples 21-22 and/or some other examples herein, wherein the baseband circuitry is configured to generate the quantized data sample, and to provide the quantized data sample to the RF circuitry on a transmit signal path, and wherein the quantized data sample represents a sample of a digital baseband signal, and the number of bits represents a quantization precision of the digital baseband signal.

Example 24 includes the communication circuitry of examples 21-22 and/or some other examples herein, wherein the baseband circuitry is configured to receive the quantized data sample from the RF circuitry, and wherein the quantized data sample represents a sample of an analog signal, and the number of bits represents a quantization precision of the analog signal.

Example 25 includes the communication circuitry of examples 21-22 and/or some other examples herein, wherein the FIFO buffer is implemented in an scratchpad memory device of the baseband circuitry.

Example 26 includes a method comprising: receiving or causing to receive data to be stored in a first in first out (FIFO) buffer; chaning or causing to change a size of the received data to be stored in the FIFO buffer based on a current amount of data stored in the FIFO buffer or an amount of currently free space available in the FIFO buffer; and storing or causing to store the data with the changes size in the FIFO buffer.

Example 27 includes the method of example 26 and/or some other examples herein, further comprising: determining or causing to determine whether to change the size of the data to be stored in the FIFO buffer in response to receipt of a piece of data to be stored in the FIFO buffer.

Example 28 includes the method of examples 26-27 and/or some other examples herein, further comprising: discarding or causing to discard a new piece of data to be stored in the FIFO buffer when the current amount of data stored in the FIFO buffer is in excess of a size threshold of the FIFO buffer.

Example 29 includes the method of examples 26-27 and/or some other examples herein, further comprising: discarding or causing to discard a new piece of data to be stored in the FIFO buffer when the amount of currently free space is less than a free space threshold amount of the FIFO buffer.

Example 30 includes the method of examples 26-29 and/or some other examples herein, wherein changing the size of the data to be stored in the FIFO buffer comprises: storing or causing to store an entirety of a new piece of data in the FIFO buffer when the current amount of data stored in the FIFO buffer is less than a first threshold; or storing or causing to store an entirety of a new piece of data in the FIFO buffer when the amount of currently free space in the FIFO buffer is greater than another first threshold.

Example 31 includes the method of example 30 and/or some other examples herein, wherein changing the size of the data to be stored in the FIFO buffer comprises: storing or causing to store a first portion of the new piece of data in the FIFO buffer when the current amount of data stored in the FIFO buffer is greater than or equal to the first threshold and less than a second threshold; or storing or causing to store the first portion of the new piece of data in the FIFO buffer when the amount of currently free space in the FIFO buffer is less than or equal to the other first threshold and greater than another second threshold.

Example 32 includes the method of example 31 and/or some other examples herein, wherein a size of the second portion is less than a size of the first portion, and changing the size of the data to be stored in the FIFO buffer comprises: storing or causing to store a second portion of the new piece of data in the FIFO buffer when the current amount of data stored in the FIFO buffer is greater than or equal to the second threshold and less than a size threshold of the FIFO buffer; or storing or causing to store a second portion of the new piece of data in the FIFO buffer when the amount of currently free space in the FIFO buffer is less than or equal to the other second threshold and greater than a free space threshold amount of the FIFO buffer.

Example 33 includes the method of example 32 and/or some other examples herein, wherein the piece of data is a word comprising a number of bits N, the size of the first portion is N/2, and the size of the second portion is N/4.

Example 34 includes the method of example 33 and/or some other examples herein, wherein N represents a quantization precision of an analog signal.

Example 35 includes the method of examples 32-34 and/or some other examples herein, wherein the first threshold is 50% of the size threshold of the FIFO buffer, and the second threshold is 75% of the size threshold of the FIFO buffer.

Example 36 includes includes one or more computer-readable media comprising instructions, wherein execution of the instructions by a field-programmable gate array (FPGA) is to cause the FPGA to perform the method of examples 26-35.

Example 37 includes one or more computer-readable media comprising instructions, wherein execution of the instructions by a baseband processor is to cause the baseband processor to perform the method of examples 26-35.

Example 38 includes a method comprising: obtaining or causing to obtain a quantized data sample to be stored in a first in first out (FIFO) buffer; selecting or causing to select a number of bits of the quantized data sample to be stored in the FIFO buffer based on a current amount of data stored in the FIFO buffer or an amount of currently free space available in the FIFO buffer; and storing or causing to store the selected number of bits in the FIFO buffer.

Example 39 includes the method of example 38 and/or some other examples herein, further comprising: determining or causing to determine whether to select the number of bits to be stored in the FIFO buffer in response to receipt of the quantized data sample.

Example 40 includes the method of examples 38-39 and/or some other examples herein, further comprising: selecting or causing to select all bits of the quantized data sample to be stored in the FIFO buffer when the current amount of data stored in the FIFO buffer is less than a first threshold; selecting or causing to select half of the number of bits of the quantized data sample to be stored in the FIFO buffer when the current amount of data stored in the FIFO buffer is greater than or equal to the first threshold and less than a second threshold; selecting or causing to select a quarter of the number of bits of the quantized data sample to be stored in the FIFO buffer when the current amount of data stored in the FIFO buffer is greater than the second threshold and less than a size threshold of the FIFO buffer; and discarding or causing to discard the quantized data sample when the current amount of data stored in the FIFO buffer is in excess of the size threshold of the FIFO buffer.

Example 41 includes the method of examples 38-39 and/or some other examples herein, further comprising: selecting or causing to select all bits of the quantized data sample to be stored in the FIFO buffer when the amount of currently free space in the FIFO buffer is greater than a first threshold; selecting or causing to select half of the number of bits of the quantized data sample to be stored in the FIFO buffer when the amount of currently free space in the FIFO buffer is less than or equal to the first threshold and greater than a second threshold; selecting or causing to select a quarter of the number of bits of the quantized data sample to be stored in the FIFO buffer when the amount of currently free space in the FIFO buffer is less than or equal to the second threshold and greater than a free space threshold amount of the FIFO buffer; and discard the quantized data sample when the amount of currently free space is less than or equal to the free space threshold amount of the FIFO buffer.

Example 42 includes the method of examples 40-41 and/or some other examples herein, wherein the quantized data sample represents a sample of an analog signal, and the number of bits represents a quantization precision of the analog signal.

Example 43 includes one or more computer-readable media comprising instructions, wherein execution of the instructions by a baseband processor is to cause the baseband processor to perform the method of examples 38-42.

Example 44 includes a method comprising: obtaining or causing to obtain a quantized data sample; determining or causing to determine a current amount of data stored in first out (FIFO) buffer or an amount of currently free space available in the FIFO buffer; selecting or causing to select a number of bits of the quantized data sample to be stored in the FIFO buffer based on the current amount of data stored in the FIFO buffer or the amount of currently free space in the FIFO buffer; and storing or causing to store the selected number of bits in the FIFO buffer.

Example 45 includes the method of example 44 and/or some other examples herein, further comprising: determining or causing to determine whether to select the number of bits to be stored in the FIFO buffer in response to receipt of the quantized data sample from radiofrequency (RF) circuitry or in response to generation of the quantized data sample by baseband circuitry.

Example 46 includes the method of examples 44-45 and/or some other examples herein, further comprising: selecting or causing to select all bits of the quantized data sample to be stored in the FIFO buffer when the current amount of data stored in the FIFO buffer is less than a first threshold; selecting or causing to select half of the number of bits of the quantized data sample to be stored in the FIFO buffer when the current amount of data stored in the FIFO buffer is greater than or equal to the first threshold and less than a second threshold; selecting or causing to select a quarter of the number of bits of the quantized data sample to be stored in the FIFO buffer when the current amount of data stored in the FIFO buffer is greater than or equal to the second threshold and less than a size threshold of the FIFO buffer; and discarding or causing to discard the quantized data sample when the current amount of data stored in the FIFO buffer is in excess of the size threshold of the FIFO buffer.

Example 47 includes the method of examples 44-45 and/or some other examples herein, further comprising: selecting or causing to select all bits of the quantized data sample to be stored in the FIFO buffer when the amount of currently free space in the FIFO buffer is greater than a first threshold; selecting or causing to select half of the number of bits of the quantized data sample to be stored in the FIFO buffer when the amount of currently free space in the FIFO buffer is less than or equal to the first threshold and greater than a second threshold; selecting or causing to select a quarter of the number of bits of the quantized data sample to be stored in the FIFO buffer when the amount of currently free space in the FIFO buffer is less than or equal to the second threshold and greater than a free space threshold amount of the FIFO buffer; and discarding or causing to discard the quantized data sample when the amount of currently free space is less than or equal to the free space threshold amount of the FIFO buffer.

Example 48 includes the method of examples 46-47 and/or some other examples herein, further comprising: generating or causing to generate the quantized data sample; and providing or causing to provide the quantized data sample to the RF circuitry on a transmit signal path, and wherein the quantized data sample represents a sample of a digital baseband signal, and the number of bits represents a quantization precision of the digital baseband signal.

Example 49 includes the method of examples 46-47 and/or some other examples herein, further comprising: receiving or causing to receive the quantized data sample from the RF circuitry, and wherein the quantized data sample represents a sample of an analog signal, and the number of bits represents a quantization precision of the analog signal.

Example 50 includes one or more computer-readable media comprising instructions, wherein execution of the instructions by a baseband processor is to cause the baseband processor to perform the method of examples 44-49.

Example 51 includes an apparatus comprising means to perform one or more elements of a method described in or related to any of examples 1-50, or any other method or process described herein.

Example 52 includes an apparatus comprising logic, modules, or circuitry to perform one or more elements of a method described in or related to any of examples 1-50, or any other method or process described herein.

Example 53 includes a method, technique, or process as described in or related to any of examples 1-50, or portions or parts thereof.

Example 54 includes an apparatus comprising: one or more processors and one or more computer readable media comprising instructions that, when executed by the one or more processors, cause the one or more processors to perform the method, techniques, or process as described in or related to any of examples 1-50, or portions thereof.

Example 55 includes a signal as described in or related to any of examples 1-50, or portions or parts thereof. Example 56 includes a signal in a wireless network as shown and described herein. Example 57 includes a message, a datagram, a frame, a packet, and/or a protocol data unit (PDU) as described in or related to any of examples 1-50, or portions or parts thereof. Example 58 includes a method of communicating in a wireless network as shown and described herein. Example 59 includes a system for providing wireless communication as shown and described herein. Example 60 includes a device for providing wireless communication as shown and described herein The foregoing description of one or more implementations provides illustration and description of various example embodiment, but is not intended to be exhaustive or to limit the scope of embodiments to the precise form disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. The description is thus to be regarded as illustrative instead of limiting.

What is claimed is:

1. Communication circuitry comprising:
   radiofrequency (RF) circuitry coupled to an antenna array; and
   baseband circuitry communicatively coupled with the RF circuitry, wherein the baseband circuitry is operable to:
     obtain a quantized data sample;
     determine an occupancy of a first in first out (FIFO) buffer;
     select a first quantization precision of the quantized data sample to be stored in the FIFO buffer based on a first occupancy of the FIFO buffer;
     select a second quantization precision of the quantized data sample based on the occupancy of the FIFO buffer being greater than the first occupancy;
     if the first quantization precision is selected, then store the quantized data sample in the FIFO buffer; and
     if the second quantization precision is selected, then:
       store a selected number of bits of the quantized data sample in the FIFO buffer; and
       discard a remaining number of bits of the quantized data sample that are not the selected number of bits.

2. The communication circuitry of claim 1, wherein the baseband circuitry is operable to:
   determine whether to select the first or second quantization precision in response to receipt of the quantized data sample from the RF circuitry.

3. The communication circuitry of claim 1, wherein the baseband circuitry is operable to:
   select the first quantization precision when a current amount of data stored in the FIFO buffer is less than a first threshold value related to the occupancy of the FIFO buffer;
   select the second quantization precision when the current amount of data stored in the FIFO buffer is greater than or equal to the first threshold value and less than a second threshold value related to the occupancy of the FIFO buffer, wherein the second quantization precision is half of the first quantization precision;
   select a third quantization precision when the current amount of data stored in the FIFO buffer is greater than or equal to the second threshold value and less than a size threshold of the FIFO buffer, wherein the third quantization precision is half of the second quantization precision; and
   discard the quantized data sample when the current amount of data stored in the FIFO buffer is in excess of the size threshold of the FIFO buffer.

4. The communication circuitry of claim 1, wherein the baseband circuitry is operable to:
   select the first quantization precision when an amount of currently free space in the FIFO buffer is greater than a first threshold value related to the occupancy of the FIFO buffer;
   select the second quantization precision when the amount of currently free space in the FIFO buffer is less than or equal to the first threshold value and greater than a second threshold value related to the occupancy of the FIFO buffer, wherein the second quantization precision is half of the first quantization precision;
   select a third quantization precision when the amount of currently free space in the FIFO buffer is less than or equal to the second threshold value and greater than a free space limit of the FIFO buffer, wherein the third quantization precision is half of the second quantization precision; and
   discard the quantized data sample when the amount of currently free space is less than or equal to the free space limit of the FIFO buffer.

5. The communication circuitry of claim 3, wherein the baseband circuitry is operable to generate the quantized data sample, and to provide the quantized data sample to the RF circuitry on a transmit signal path, and wherein the quantized data sample represents a sample of a digital baseband signal, and the number of bits represents a quantization precision of the digital baseband signal.

6. The communication circuitry of claim 3, wherein the baseband circuitry is operable to receive the quantized data sample from the RF circuitry, and wherein the quantized data sample represents a sample of an analog signal, and the number of bits represents a quantization precision of the analog signal.

7. The communication circuitry of claim 3, wherein the FIFO buffer is implemented in a scratchpad memory device of the baseband circuitry.

* * * * *